US009374778B2

(12) United States Patent
Nilsson et al.

(10) Patent No.: US 9,374,778 B2
(45) Date of Patent: Jun. 21, 2016

(54) ADAPTIVE FILTERING ARCHITECTURE

(75) Inventors: Andreas Nilsson, Göteborg (SE); Björn Johannisson, Kungsbacka (SE); Sven Petersson, Sävedalen (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 70 days.

(21) Appl. No.: 14/127,195

(22) PCT Filed: Jun. 22, 2011

(86) PCT No.: PCT/EP2011/060523
§ 371 (c)(1),
(2), (4) Date: Dec. 18, 2013

(87) PCT Pub. No.: WO2012/175133
PCT Pub. Date: Dec. 27, 2012

(65) Prior Publication Data
US 2014/0119259 A1    May 1, 2014

(51) Int. Cl.
*H04W 52/02* (2009.01)
*H04W 88/08* (2009.01)
*H04W 16/08* (2009.01)

(52) U.S. Cl.
CPC .......... *H04W 52/0206* (2013.01); *H04W 16/08* (2013.01); *H04W 88/08* (2013.01); *Y02B 60/50* (2013.01)

(58) Field of Classification Search
None
See application file for complete search history.

(56) References Cited

U.S. PATENT DOCUMENTS

| 5,548,813 A * | 8/1996 | Charas et al. .............. 455/562.1 |
| 2002/0019235 A1 | 2/2002 | Kim et al. |
| 2012/0063377 A1* | 3/2012 | Osterling et al. ............. 370/311 |

FOREIGN PATENT DOCUMENTS

| EP | 1954075 A1 | 8/2008 |
| EP | 2157811 A1 | 2/2010 |
| WO | 2008143567 A1 | 11/2008 |

* cited by examiner

*Primary Examiner* — Ian N Moore
*Assistant Examiner* — Justin T Van Roie
(74) *Attorney, Agent, or Firm* — Patents on Demand, P.A.; Brian K. Buchheit; Scott M. Garrett

(57) ABSTRACT

A node for use in a wireless communication system comprising at least two Tx-chains and at least two Rx-chains is provided. A first means for a switch and filter network function MSN is arranged across all Tx-chains. The first MSN is arranged to output one antenna sector signal comprising: a radio sector signal, or a split radio sector signal, the splitting of a radio sector signal allowing one radio sector signal to feed sector antennas in more than one sector, each sector having at least one sector antenna. The first or a second MSN can also be arranged across Rx-chains. Further, a method to reduce power consumption in a node and a wireless communication system comprising the node is provided.

17 Claims, 16 Drawing Sheets

ADAPTIVE FILTERING ARCHITECTURE

TECHNICAL FIELD

The present invention relates to the field of nodes in a communication system such as different types of Radio Base Stations (RBS) used in wireless communication systems and means for reducing power consumption in the nodes.

BACKGROUND

The demand for wireless broadband is increasing and different solutions for meeting the demands are constantly presented. One solution is to increase the spectral efficiency of the communication network, which can be done by introducing the new radio access technology LTE (Long Term Evolution).

Another way to do this is to deploy more base stations and use smaller cells and the capacity of the system will be increased. However, the large amount of base stations also gives a high energy consumption which will be expensive and has a negative effect on the environment. Furthermore, the high bit rate of future wireless broadband needs a lot of signal processing in the base stations, and this will increase the energy consumption even more. Therefore there is a general need for reducing the energy consumption in the base stations.

Many small cells and dense deployment of base stations will probably also cause an increase of the co-channel interference between different cells. The co-channel interference will lead to deteriorated Signal to Interference plus Noise Ratio (SINR) and therefore lower bit rate for the customers.

One prior art solution for reducing the power consumption of a base station is called "Three sector omni". This basically means that during low traffic scenarios a three sector base station turn off two out of three base bands, radios and power amplifiers and serves all three sectors with one baseband, radio and power amplifier. The radio chain in use is connected to the existing sector antennas at site such that an effective omni directional pattern is obtained. This type of solution is described in WO 2008/143567 A1.

Base stations often have three sectors, and each sector have its own base band, radio and power amplifier, se FIGS. 1a and 1b. A first sector antenna 101 covers the first sector, a second sector antenna 102 the second sector and a third sector antenna 103 the third sector. In transmit mode, Tx-mode, also called downlink mode, each antenna is connected to a Tx-chain (transmit chain) comprising means for a Tx-baseband 120 connected in series with means for a Tx-radio 110 and a power amplifier 100 with the power amplifier connected to the sector antenna. Each sector operates over a total frequency band ftot of the RBS. The majority of the power consumption is in the power amplifiers but also the means for Tx-base band and Tx-radio consume considerable power. Today, base stations run all three sectors all the time regardless of the amount of traffic load. This leads to unnecessary high power consumption due to that all means for Tx-base band and Tx-radio as well as power amplifiers for all sectors are running constantly.

When the Radio Base Station is operating in receive mode, Rx-mode, also called uplink mode, each sector antenna is also connected to an Rx-chain (receive chain) as illustrated in FIG. 1b. The Radio Base Station of FIG. 1b comprises three sectors with three Tx-chains and three Rx-chains. Each Tx-chain and each Rx-chain comprises an antenna end and a radio end, the antenna end is connected to one Tx/Rx-switch 130. Each Tx/Rx-switch is arranged to switch a sector antenna 101, 102, 103 to one Tx or one Rx-chain, the sector antenna being arranged to operate within a certain sector in space. Each Tx-chain comprises means for a Tx-base band 120 and a Tx-radio 110 as well as a power amplifier 100, PA, connected in series and with the power amplifier being connected to the Tx/Rx-switch 130. Each Rx-chain comprises means for an Rx-base band 160 and an Rx-radio 150 as well as a low noise amplifier 140, LNA, connected in series and with the low noise amplifier being connected to the Tx/Rx-switch 130. Each Tx-chain is arranged to operate within a total transmit frequency band ftx and each Rx-chain is arranged to operate within a total receive frequency band frx. The switching between Rx and Tx-mode in a sector is performed with the Tx/Rx-switch 130 which can be realized as a duplexer or a circulator.

FIG. 2 illustrates an energy saving solution called "Three sector omni". In "Three sector omni" a switch network 204 has been placed between the sector antennas, 101-103, and the power amplifiers. For low traffic scenarios the switch network can be configured so that one Tx-base band 120, one Tx-radio 110 and one power amplifier 100 serves all three sectors. The remaining Tx-base bands, Tx-radios and power amplifiers could then be turned off in order to reduce the power consumption. The whole frequency band, ftx, will still be used in each sector. This lead to that the gain of the radiation pattern from the sector antennas of the site will be reduced 5 dB compared to the prior art solution shown in FIG. 1a. This will have a negative impact on the capacity and coverage of the site.

The prior art solutions described above can also be used in Rx-mode. The power consumption in receive mode is substantially less than in transmit mode but it is of course also desirable to reduce power consumption in the receive mode.

The problem with prior art solutions has been exemplified with a three sector Radio Base Station. The problem is however in general applicable to nodes in communication systems such as different types of Radio Base stations in wireless communication systems.

There is thus a need for an improved node with a possibility for reduced power consumption at low traffic load, especially in transmit mode, without having a negative impact on the total capacity and coverage.

SUMMARY

The object of the invention is to reduce at least some of the mentioned deficiencies with the prior art solutions and to provide:
 a node and
 a method to reduce power consumption in a node
to solve the problem to achieve a node with reduced power consumption without having a negative impact on the total capacity and coverage of the site.

The object is achieved by a node for use in a wireless communication system comprising at least two Tx-chains and at least two Rx-chains. Each Tx-chain and each Rx-chain comprises an antenna end and a radio end. The antenna end is connected directly or indirectly to a sector antenna. Each sector antenna is arranged to operate within a certain sector in space, each Tx-chain comprising means for a Tx-base band and a Tx-radio as well as a power amplifier, PA, connected in series and with the power amplifier being connected to one sector antenna directly or indirectly. Each Rx-chain comprises means for an Rx-base band and an Rx-radio as well as a low noise amplifier, LNA, connected in series and with the low noise amplifier connected to one sector antenna directly or indirectly. Each Tx-chain is arranged to operate within a total transmit frequency band ftx and each Rx-chain is arranged to operate within a total receive frequency band frx wherein a first means for a switch and filter network function MSN is arranged across all Tx-chains before or after the power amplifiers. The first MSN comprises at least one adaptive filter and splitter means having an input end and an output end, the output end of which is connected to an input end of at least one switch/combiner means. The first MSN is arranged to receive at least one radio sector signal from at least one Tx-chain, directly or indirectly, at the input end of its corresponding adaptive filter and splitter means and to output from the output end of each of said switch/combiner means one antenna sector signal, the antenna sector signal comprising:

- a radio sector signal from its corresponding Tx-chain, the radio sector signal being arranged to operate within the total transmit frequency band ftx, or
- a split radio sector signal from any of the Tx-chains, the split radio sector signal arranged to operate within a part of the total transmit frequency band ftx, the splitting of a radio sector signal allowing one radio sector signal to feed sector antennas in more than one sector, each sector having at least one sector antenna.

The object is further achieved by a method to reduce power consumption in a node according to any one of claims 1-18, wherein:

- a first MSN is inserted across all Tx-chains before or after the power amplifiers and/or a second MSN is inserted across all Rx-chains before or after the low noise amplifiers or
- a first MSN is inserted across all Tx- and Rx-chains after the power amplifiers and before the low noise amplifiers and wherein traffic load information is received at the control input to the first and/or second MSN. Through processing means in the first and/or second MSN, or by manual means, the first and/or second MSN is configuring the adaptive filter and splitter means and the switch/combiner means in order to minimize the number of radio sector signals, thus allowing a complete, or part of a, Tx and/or Rx chain to be turned off for each reduction of a radio sector signal, needed for supplying antenna sector signals to all sector antennas and/or needed for forwarding information from all antenna sector signals with respect to traffic load, by means of a control signal from the processing means of the first and/or second MSN to the Tx- and Rx-chains or by manual means or external control signals.

The invention also provides a wireless communication system comprising the node according to claims 1-18.

Additional advantages are achieved by implementing one or several of the features of the dependent claims, as will be explained below.

DETAILED DESCRIPTION

Figure 1A:
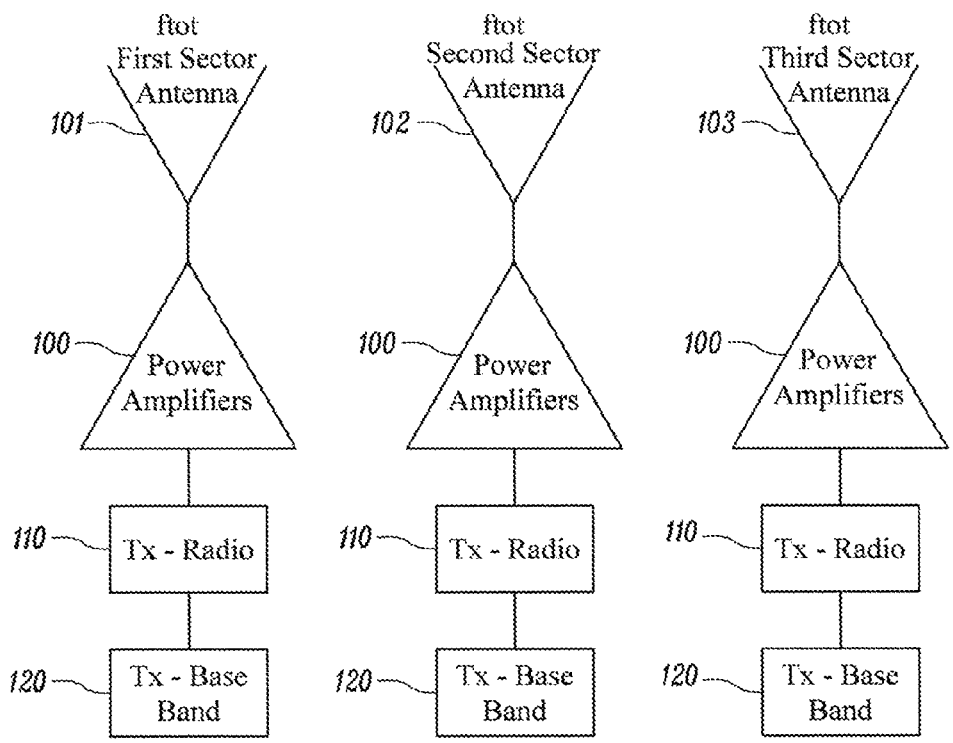
FIG. 1a schematically shows a prior art solution of a node with all sectors operating simultaneously over the total bandwidth ftot, in transmit mode.
Figure 1B:
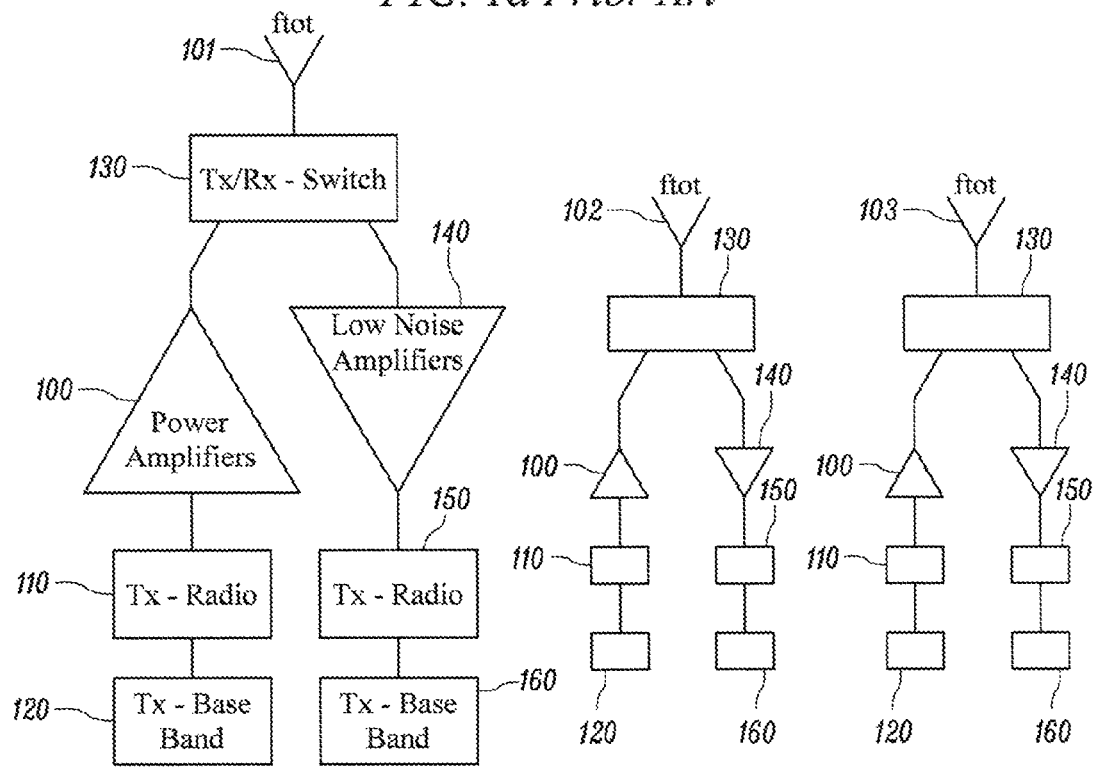
FIG. 1b, schematically shows a prior art solution of a node with all sectors operating simultaneously over the total bandwidth ftot, in transmit and receive mode.
Figure 2:
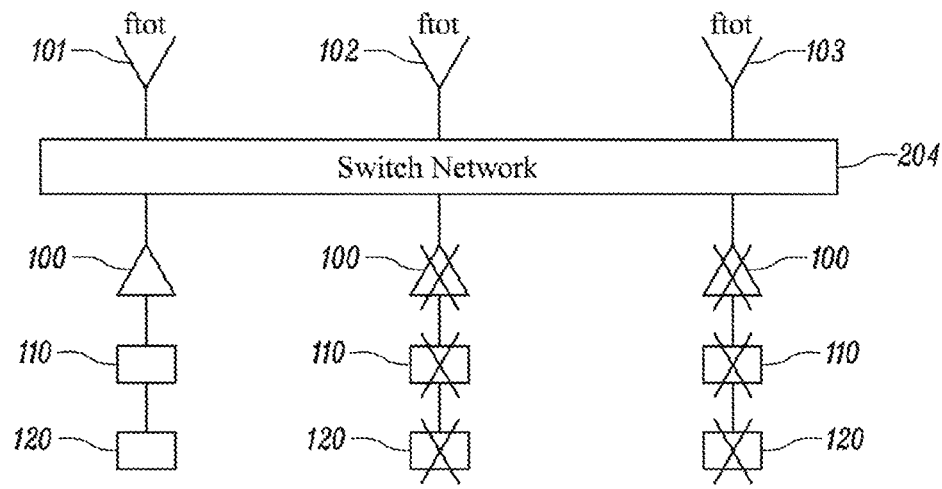
FIG. 2 schematically shows a prior art solution "Three sector omni".

The invention will now be described with reference to the enclosed drawings, FIGS. 3-14. FIGS. 1a, 1b and 2 are described in association with the Background part.

The invention is intended for a node for use in a wireless communication system comprising at least two Tx-chains and at least two Rx-chains. Each Tx-chain and each Rx-chain comprises an antenna end and a radio end. The antenna end is connected, directly or indirectly, to a sector antenna 101, 102, 103. Each sector antenna is arranged to operate within a certain sector in space, each Tx-chain comprises means for a Tx-base band 120 and a Tx-radio 110 as well as a power amplifier 100, PA, connected in series and with the power amplifier being connected to one sector antenna directly or indirectly. Each Rx-chain comprises means for an Rx-base band 160 and an Rx-radio 150 as well as a low noise amplifier 140, LNA, connected in series and with the low noise amplifier connected to one sector antenna, directly or indirectly. Each Tx-chain is arranged to operate within a total transmit frequency band ftx and each Rx-chain is arranged to operate within a total receive frequency band frx.

The direct and indirect connection will be explained below.

The basic idea of this invention is to split the available frequency band between the number of sectors that is served by a node. Normally, each sector of a node uses the whole available frequency band, but for low traffic scenarios only parts of the whole frequency band will be enough for handling the traffic in each sector. When the whole frequency band is divided between the sectors, some of the base bands, radios and power amplifiers could be turned off to save energy.

Henceforth in the description and claims a sector antenna is defined as any suitable antenna for wireless communication such as e.g. an array antenna, a dipole or a patch antenna.

The invention will henceforth be illustrated with examples of nodes comprising a three sector RBS in the transmit mode as this is the mode with most potential for power reductions. It is also possible to use the invention in receive mode, this will also be illustrated in FIG. 16. In transmit mode the Tx-chains of the node is operating over a total transmit frequency band ftx and in receive mode the Rx-chains of the node is operating over a total receive frequency band frx. The invention can also be used for nodes such as Radio Base Stations having two, four or more sectors. The invention is however in general applicable to nodes such as different types of Radio Base Stations.

The invention can be implemented in wireless communication systems such as FDD (Frequency Division Duplexing) and TDD (Time Division Duplexing). In FDD systems ftx and frx are separated but in TDD ftx is equal to frx.

Figure 3:
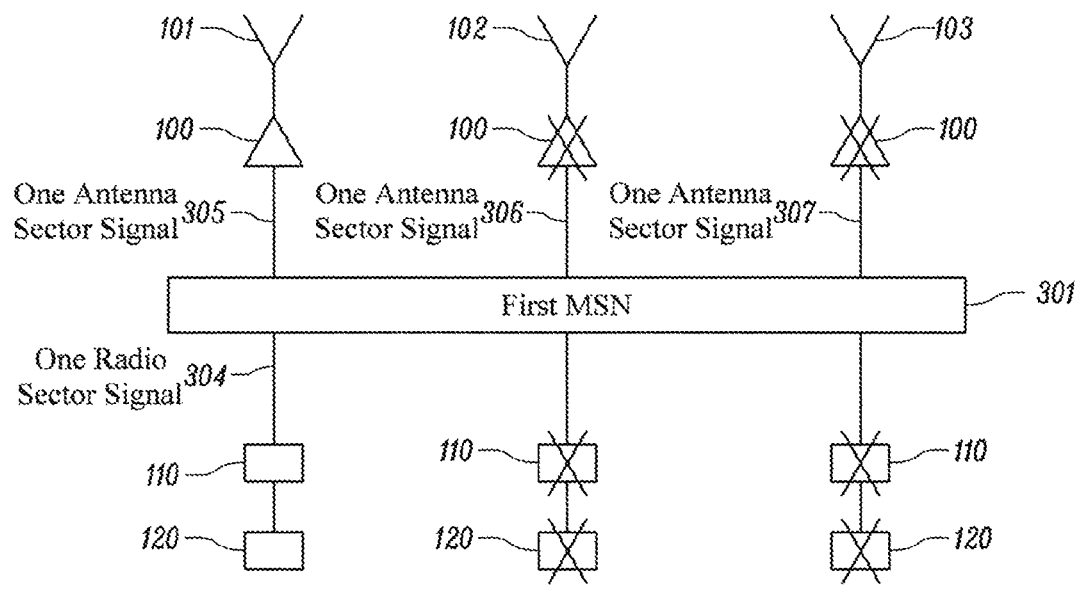
FIG. 3 schematically shows one basic configuration of the invention.

FIG. 3 illustrates one basic configuration of the present invention for a node such as a Radio Base Station (RBS) in transmit mode operating in three sectors over the total transmit frequency band ftx. Here a first means for a switch and filter network function, MSN, 301 has been arranged across all Tx-chains before the power amplifiers, i.e. between the power amplifiers 100 and the Tx-radios 110. The first MSN can be used to turn off all but one Tx-base band and Tx-radio, in order to save energy. The first MSN comprises at least one switch/combiner means and at least one adaptive filter and splitter means as will be further explained. The first MSN is arranged to receive at least one radio sector signal 304 from at least one Tx-chain and to output from an output end of each of said switch/combiner means one antenna sector signal 305-307. Depending on traffic, the antenna sector signal comprises a radio sector signal using the total transmit frequency band ftx or a split radio sector signal using a sub band comprising a part of the total transmit frequency band ftx. Each split radio sector signal is arranged to be transferred to different sectors by arranging the switch/combiner means and the adaptive filter and splitter means to be configured in response to traffic load, thus being able to optimize the number of radio sector signals needed for supplying antenna sector signals to all sector antennas with respect to traffic load. The first MSN can receive information of traffic load in different sectors from the wireless communication network and based on this information decide if means for Tx-baseband and Tx-radio, as well as means for Rx-baseband and Rx-radio, can be turned off and if so which means for basebands and radios to turn off. The turning off of means for basebands and radios can also be initiated directly from the wireless communication system to the basebands and radios concerned, the first MSN will then be informed of which basebands and radios that are turned off and then configure the first MSN, as will be further explained.

Figure 4:
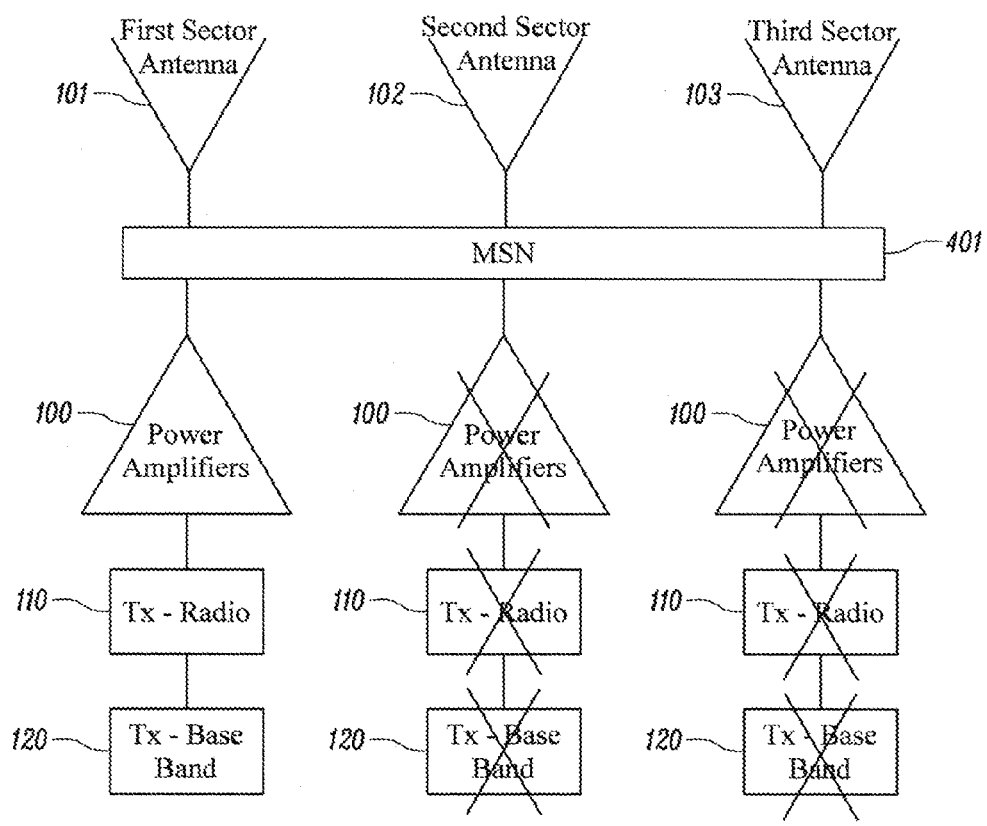
FIG. 4 schematically shows a further basic configuration of the invention.

FIG. 4 illustrates a further basic configuration of the present invention for a node such as Radio Base Station (RBS) in transmit mode operating in three sectors over a total transmit frequency band ftx. Here the first MSN 401 has been arranged across all Tx-chains after the power amplifiers 100, i.e. between the sector antennas 101-103, and the power amplifiers. The first MSN otherwise works as described above for the first MSN in FIG. 3. This solution is quite similar to the "Three sector omni", except that in the invention the total transmit frequency band ftx can be divided into two or three sub bands as described above in association with FIG. 3. This will increase the gain of the radiation pattern about 5 dB compared to the "Three sector omni" when the invention uses the configuration with three sub bands, one sub band for each sector. Other configurations are also possible as will be exemplified.

The definition of before or after the power amplifiers is made with reference to the direction of the radio sector signal, i.e. before the power amplifier is between the power amplifiers 100 and the Tx-radios 110 before the radio sector signal reaches the power amplifier. After the power amplifier is between the sector antennas 101-103 and the power amplifiers 100 after the radio sector signal has passed the power amplifier. When the invention is implemented in both Tx- and Rx-mode in FDD a Tx/Rx-switch is connected to the sector antenna to switch between Tx- and Rx-mode in case a Tx and Rx chain have a common sector antenna and when both Tx- and Rx-mode is implemented in TDD a Tx/Rx-switch is arranged between the MSN and the Tx/Rx-chains as will be shown in FIG. 16b.

The Rx-chain, not shown in FIGS. 3 and 4, can be connected to the same sector antenna as the corresponding Tx-chain via a Tx/Rx-switch, switching between Tx and Rx mode in a sector. The Tx/Rx switch can e.g. be realized as a duplexer or circulator. The Tx and Rx chain can also have its respective sector antenna, which means that there is a separate sector antenna for Rx and a separate sector antenna for Tx in one or several sectors. In this case the Tx/Rx switch is not needed. In a three sector site two sectors can e.g. each have a Tx/Rx switch connected to one sector antenna common for a Tx and Rx chain and one sector can have a separate antenna for a Tx chain and a separate antenna for an Rx chain. This means that a Tx or Rx chain is connected to a sector antenna either directly or indirectly via a Tx/Rx switch. The indirect connection can thus be realized with a Tx/Rx-switch.

Another possibility is that there are more than one Tx and/or more than one Rx chain in one or several sectors. This is e.g. the case in LTE systems. In this case a Tx and an Rx chain can use a common sector antenna via a Tx/Rx switch as described above or one or several Tx chains and one or several Rx chain has its respective sector antenna and a Tx/Rx-switch is thus not needed. A further possibility is that there are different numbers of Rx and Tx-chains for each sector. If there are e.g. 2 Tx chains and 4 Rx chains in one sector, there can be two combinations of Tx/Rx chains each combination connected to a sector antenna via a Tx/Rx switch and an additional two sector antennas each connected to an Rx-chain.

FIGS. 5-16 shows different examples and details of the present invention. FIG. 17 show an example of a method of the invention to reduce power consumption in a node.

Figure 5:
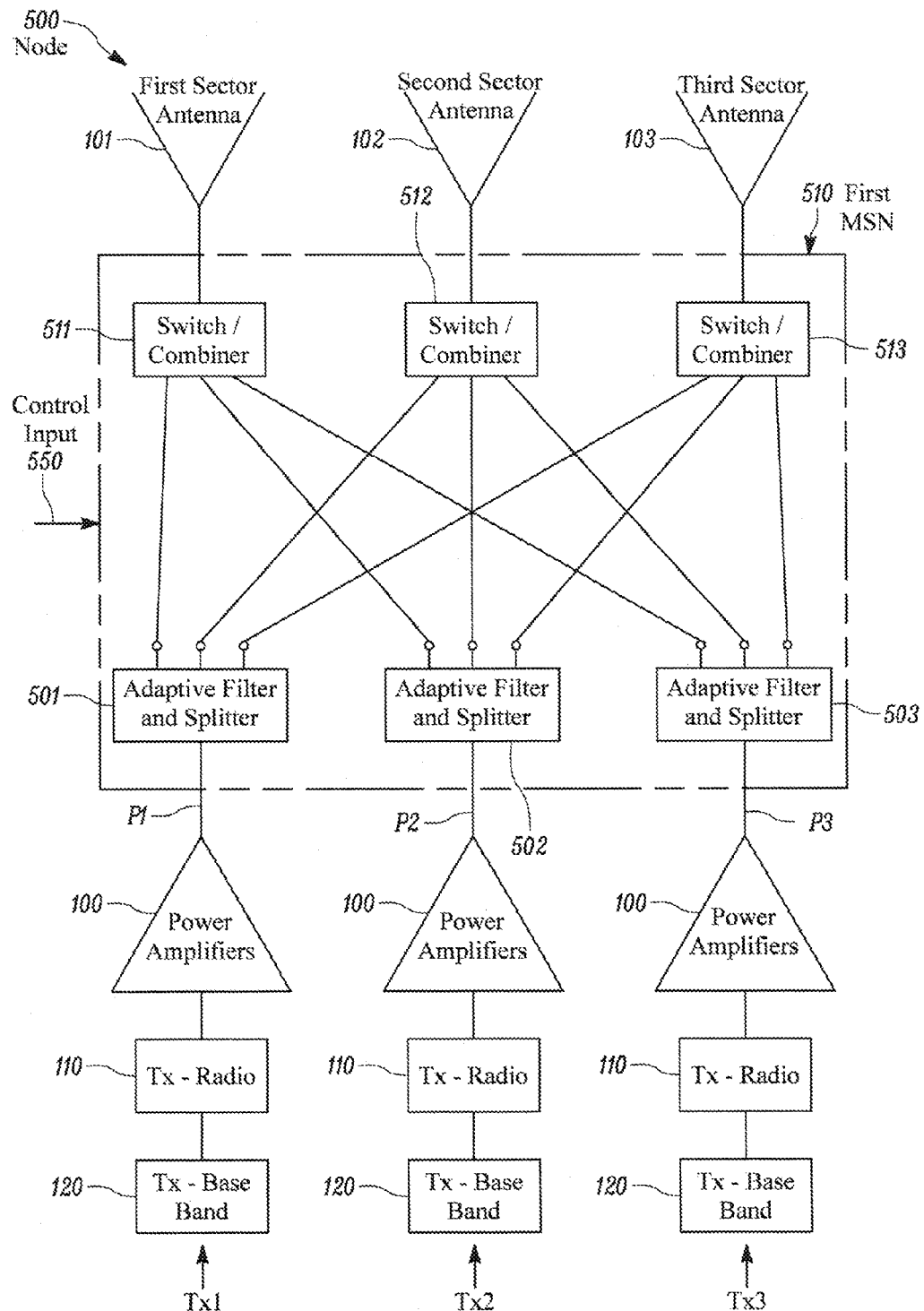
FIG. 5 schematically shows different possibilities for configuring an MSN.

FIG. 5 illustrates a more detailed description of the first MSN. In this illustration the first MSN comprises three adaptive filter and splitter means 501-503 and three switch/combiner means 511-513.

FIG. 5 illustrates the different possibilities for configuring the first MSN of the invention. A second MSN, see FIG. 16b and associated text, can also be configured in the same way. A node 500 comprises the RBS with three Rx-chains and three Tx-chains, the first Tx1, the second Tx2 and the third Tx3. Each Tx-chain comprises means for the Tx-base band 120 and the Tx-radio 110 as well as the power amplifier 100, PA, connected in series and with each power amplifier connected to an adaptive filter and splitter means. The Rx chains are not shown in FIG. 5. The Tx-chains are arranged to operate within a first, a second and a third sector with corresponding first, second and third radio sector signals s1-s3 arranged to be generated in the Tx-chains where each radio sector signal s1-s3 is arranged to operate in a total transmit frequency band ftx and being arranged to be forwarded over a first, a second and a third path, p1-p3. The first MSN 510 is arranged across all Tx-chains after the power amplifiers, as in the basic configuration of FIG. 4, and comprises a first, a second and a third adaptive filter and splitter means, 501-503 and a first, a second and a third switch/combiner means 511-513. The first MSN 510 can also be arranged across all Tx chains before the power amplifiers as in the basic configuration according to FIG. 3.

The first MSN 510 is arranged to receive at least one radio sector signal from at least one Tx-chain, directly or indirectly, at an input end of its corresponding adaptive filter and splitter means and to output from the output end of each of said switch/combiner means one antenna sector signal, the antenna sector signal comprising:
- a radio sector signal from its corresponding Tx-chain, the radio sector signal being arranged to operate within the total transmit frequency band ftx, or
- a split radio sector signal from any of the Tx-chains, the split radio sector signal arranged to operate within a part of the total transmit frequency band ftx, the splitting of a radio sector signal allowing one radio sector signal to feed sector antennas in more than one sector, each sector having at least one sector antenna.

The first MSN also has a control input 550 which will be further explained below. The control input can supply the MSN with information about traffic load.

The first adaptive filter and splitter means can be arranged to split the first path p1 into three sub paths, one to each switch/combiner means, each sub path intended for a split and filtered sub signal of the first radio sector signal s1.

The second adaptive filter and splitter means can be arranged to split the second path p2 into three sub paths, one to each switch/combiner means, each sub path intended for a split and filtered sub signal of the second radio sector signal s2.

The third adaptive filter and splitter means can be arranged split the third path p3 into three sub paths, one to each switch/combiner means, each sub path intended for a split and filtered sub signal of the third radio sector signal s3.

The adaptive filter and splitter means is thus used to split one radio sector signal s1-s3 into one or several sub signals and adaptively control which part of the frequency band that will be in each sub signal. In the example of FIG. 5 each radio sector signal is split into three sub signals. Each sub signal is arranged to operate within a part of the total transmit frequency band ftx. A split and filtered sub signal of a radio sector signal is also called a split radio sector signal and a split and filtered antenna sector signal is also called a split antenna sector signal.

The splitting possibilities described in FIG. 5 requires that each adaptive filter and splitting means comprises a 1-to-3 splitter means or some other means to perform the splitting into three sub signals. An example of a configuration where one of the adaptive filter and splitting means has a 1-to-3 splitter means is shown e.g. in FIG. 8. As will be shown in further examples the adaptive filter and splitting means can also be provided with a direct path for an unsplit radio sector signal.

As mentioned the adaptive filter and splitter means and the switch/combiner means of the first MSN can be configured in response to traffic load, thus being able to minimize the number of radio sector signals needed for supplying antenna sector signals to all sector antennas with respect to traffic load. This can be accomplished by the traffic load information being arranged to be received at a control input 550 to the first MSN. Through processing means in the first MSN, the first MSN is arranged to control, with the processing means and the traffic load information, the configuration of the adaptive filter and splitter means 501-503 and the switch/combiner means 511-513 in order to minimize the number of radio sector signals. A second MSN, which will be described in association with FIG. 16a, can be configured in response to traffic load in the same way as described for the first MSN above.

The traffic load information can be arranged to be supplied to the control input 550 of the first MSN from the wireless communication system or from an external source.

The configuration of the adaptive filter and splitter means 501-503 and the switch/combiner means 511-513 in order to minimize the number of radio sector signals with respect to traffic load, can be arranged by manual adjustments of the adaptive filter and splitter means and the switch/combiner means.

A part of, or a complete Tx and/or Rx chain, can be arranged to be turned off for each reduction of a radio sector signal by means of a control signal from the processing means of the first MSN to the Tx- or the Rx-chains or by manual means or by external control signals.

Figure 6:
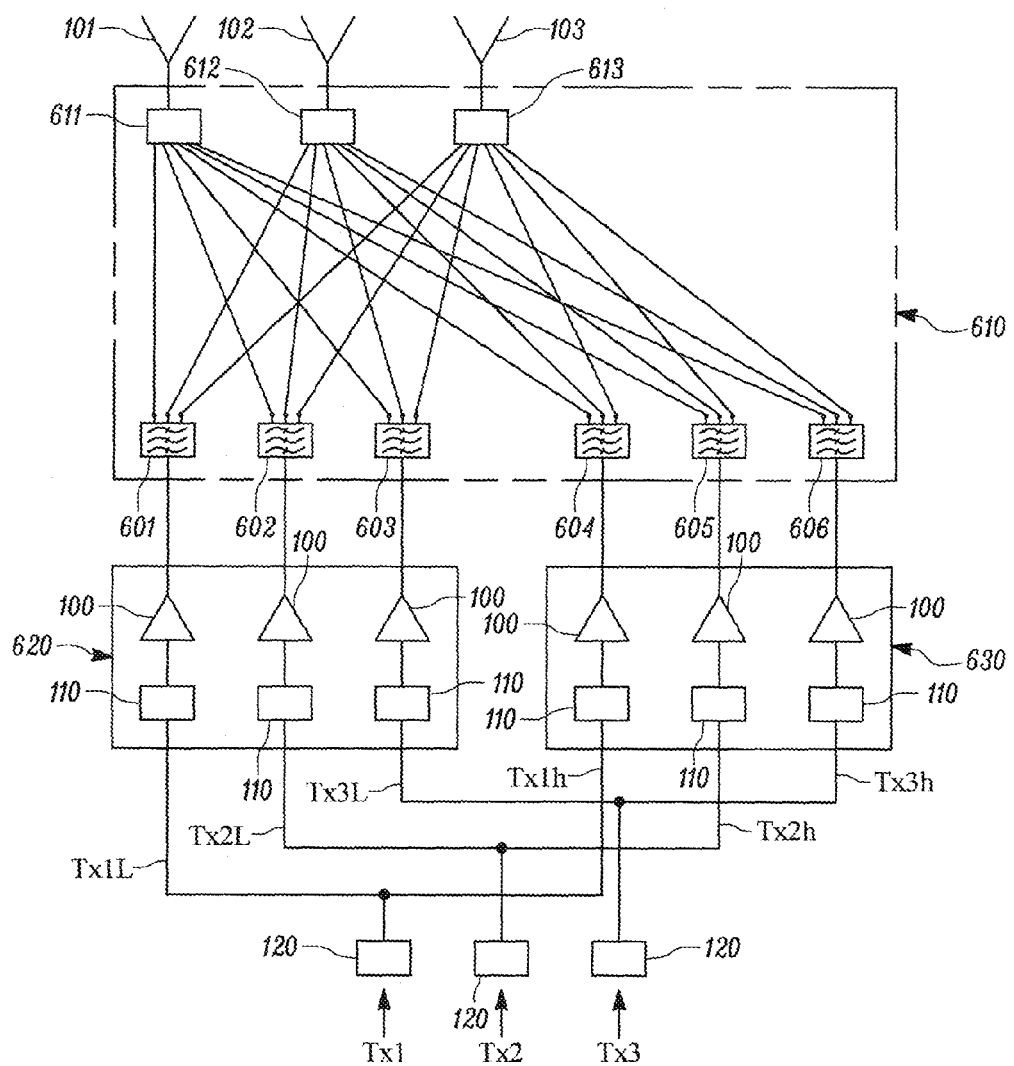
FIG. 6 schematically illustrates the principle of Carrier aggregation.

FIG. 6 illustrates the principle of Carrier aggregation for a node 600 comprising a first MSN 610. The node 600 comprises the RBS with three Rx-chains and three Tx-chains, the first Tx1, the second Tx2 and the third Tx3. The Rx chains are not shown in FIG. 6. The configuration of FIG. 6 has the same function as described for FIG. 5 above with the difference that the means for Tx-radio 110 and the power amplifier 100 for each of the three Tx-chain is divided in a low frequency carrier part Txl, in the example of FIG. 6 Tx1*l*-Tx3*l*, in a low frequency part 620 and a high frequency carrier part Txh, in the example of FIG. 6 Tx1*h*-Tx3*h*, in a high frequency part 630. Each carrier part in each Tx-chain is connected to one adaptive filter and splitter means 601-606. The Carrier aggregation can be realized with a node wherein the means for Tx-radio and the power amplifier for at least one Tx-chain is divided in at least two carrier parts, each carrier part operating within a part of the total transmit frequency band ftx and each carrier part is arranged to forward a divided radio sector signal within the frequency range of the carrier part to one adaptive filter and splitter means 601-606, the adaptive filter and splitter means is arranged to forward:
- an unsplit divided radio sector signal to its corresponding switch/combiner means 611-613 where the divided radio sector signals are arranged to be combined into one antenna sector signal comprising all carrier parts, the antenna sector signal being arranged for operation within the total transmit frequency band ftx, this signal thus comprising a radio sector signal arranged to operate within the total transmit frequency band, or
- at least two "split divided radio sector signals", each "split divided radio sector signal" arranged to be forwarded to different switch/combiners where the "split divided radio sector signals" from different carrier parts are combined into one split antenna sector signal comprising all carrier parts, the split antenna sector signal is arranged for operation within a part of the total transmit frequency band ftx, this signal thus comprising a split radio sector signal from any of the Tx-chains, the split radio sector signal arranged to operate within a part of the total transmit frequency band ftx.

The "split divided radio sector signal" is a divided radio sector signal that has been split and filtered in a splitter means as described e.g. in association with FIG. 5.

It is not necessary to divide all Tx-chains in different carrier parts. One of the Tx-chains can e.g. be undivided and two divided. It is also possible to divide into more than two frequency ranges. A main advantage of Carrier aggregation is that the bandwidth within each Tx-chain can be increased thus extending the total transmit frequency band ftx. Carrier aggregation can also be used in Rx-mode.

Figure 7:
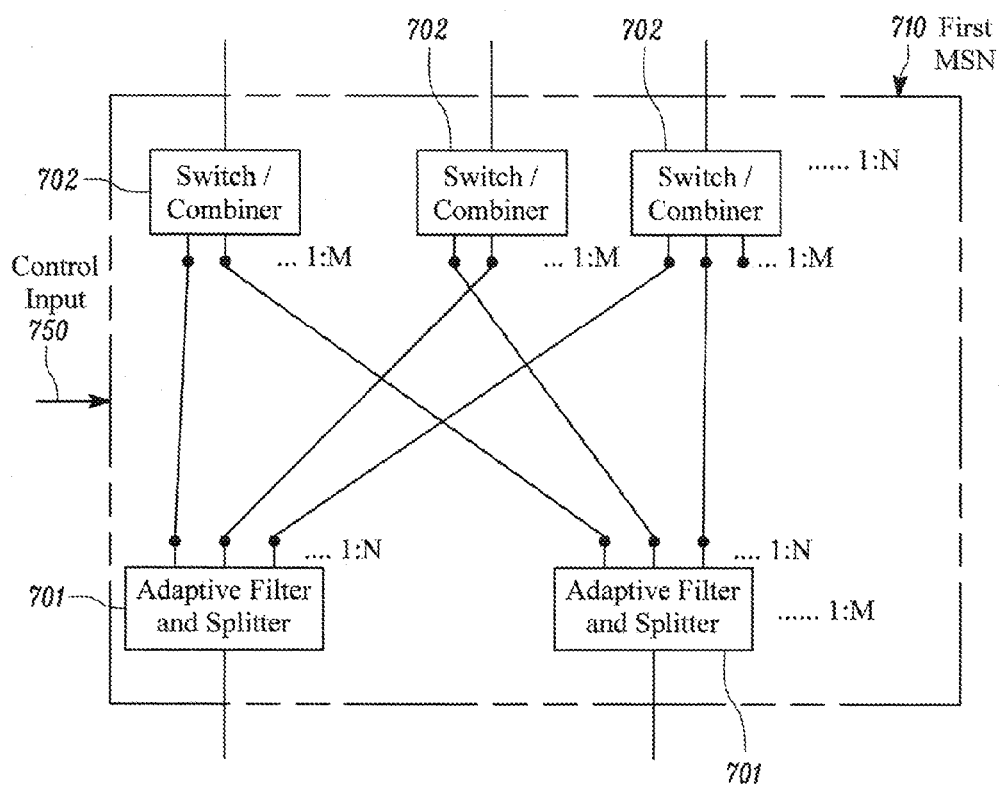
FIG. 7 schematically illustrates general configuration possibilities for a first or second MSN.

FIG. 7 illustrates general configuration possibilities for a first or second MSN 710. N in FIG. 7 denotes the total number of sector antennas for all sectors. As there is at least one sector antenna in each sector, N is equal to or greater than the number of sectors. M denotes the total number of Tx-chains in an FDD application for a configuration of a first MSN according to e.g. FIG. 5 or the total number of Rx-chains for a second MSN in an FDD application e.g. according to FIG. 16*a* or the total number of Tx/Rx-chains in a TDD application of a first MSN e.g. according to FIG. 16*b*.

The first or second MSN 710 in the example of FIG. 7 thus comprises M adaptive filter and splitter means 701 and N switch/combiner means 702, where M≥N, and the number of outputs at the output end of the adaptive filter and splitter means is equal to N and the number of inputs at the input end of the switch/combiner means is equal to M, thus allowing each adaptive filter and splitter means to be connected to each switch/combiner means.

Figure 8:
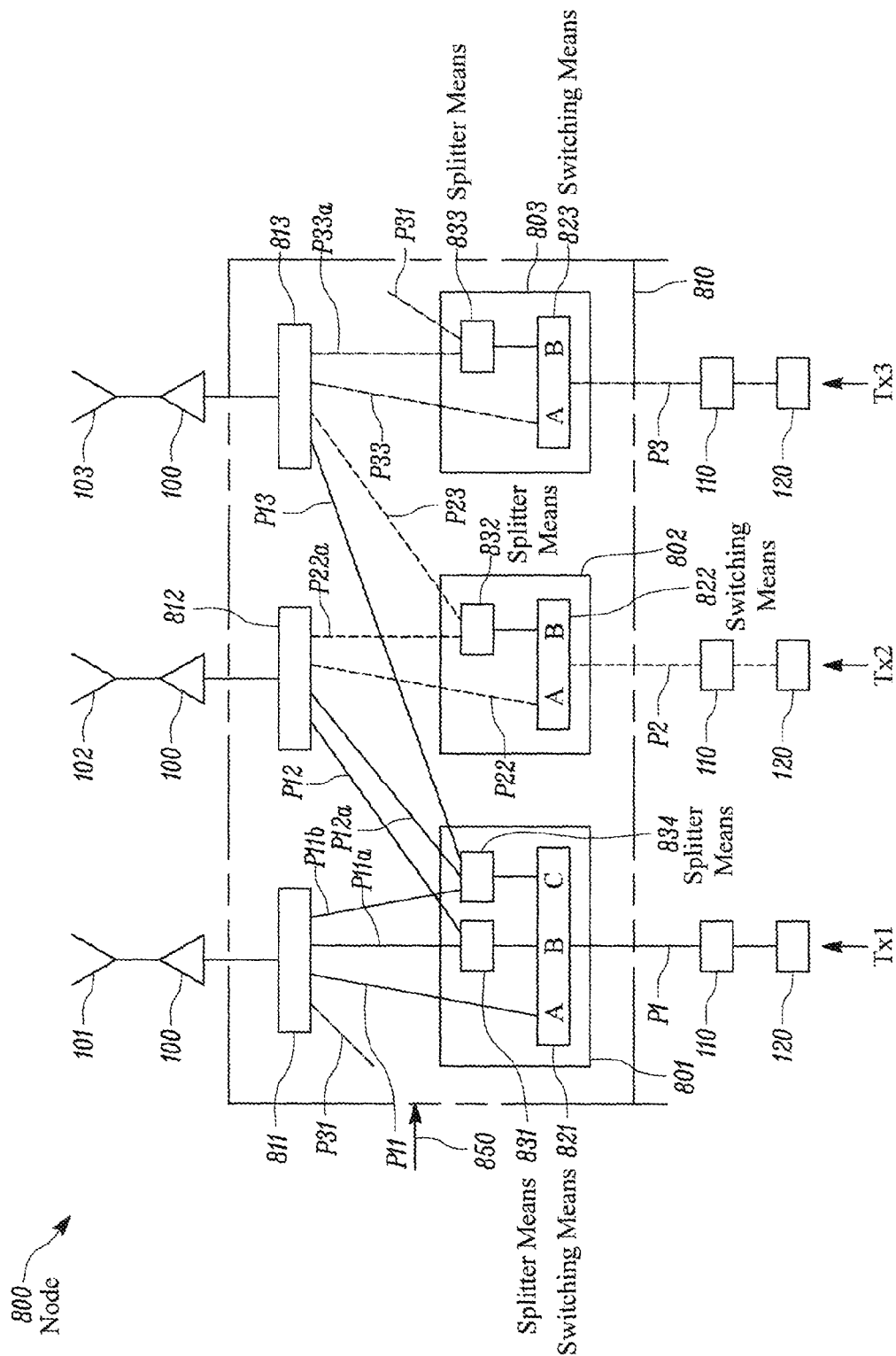
FIG. 8 schematically shows an example of configuration possibilities for the first MSN.

FIG. 8 shows an example of configuration possibilities for the first MSN of the invention. A node 800 comprises three Rx-chains and three Tx-chains, the first Tx1, the second Tx2 and the third Tx3. The Tx-chains being arranged to operate within a first, a second and a third sector with corresponding first, second and third radio sector signals s1-s3 arranged to be generated in the Tx-chains where each radio sector signal s1-s3 is arranged to operate in a total transmit frequency band ftx and being arranged to be forwarded over a first, a second and a third path, (p1-p3). The first MSN 810 is arranged across all Tx-chains before the power amplifiers, as in the basic configuration of FIG. 3, and comprises a first, a second and a third adaptive filter and splitter means, 801-803, each having an input end and an output end, the output end of which is connected to an input end of at least one of a first, a second and a third switch/combiner means 811-813. The output end of each switch/combiner means being connected via the power amplifier, directly or indirectly, to a sector antenna. The adaptive filter and splitter means comprises a first, second and third switching means 821-823 and a first, second and third 1-to-2 splitter means 831-833 respectively. The first adaptive filter and splitter means further comprises a first 1-to-3 splitter means 834. Each splitter means comprises a splitting and filter function. The first switching means receives a first radio sector signal from the first Tx-chain, the second switching means receives a second radio sector signal from the second Tx-chain and the third switching means receives a third radio sector signal from the third Tx-chain. Each switching means being arranged to forward:

an antenna sector signal comprising a radio sector signal in the Tx-chain of the switching means, directly or indirectly, to a sector antenna via a switch/combiner means and a power amplifier or an antenna sector signal comprising a radio sector signal split at the 1-to-2 splitter means or at the 1-to-3 splitter means, the split radio sector signals further forwarded in at least two Tx-chains, directly or indirectly, to a sector antenna via a switch/combiner means and a power amplifier, the first switching means having three positions; A, B and C, the second and third switching means having two positions A and B. The first MSN 810 can also be arranged across all Tx chains after the power amplifiers according to the basic configuration according to FIG. 4.

When the first switching means 821 is in the:

A position, the first radio sector signal is forwarded to the first switch/combiner 811, B position, the first radio sector signal is forwarded to the first 1-to-2 splitter means 831, C position, the first radio sector signal is forwarded to the first 1-to-3 splitter means 834.

When the second switching means 822 is in the:

A position, the second radio sector signal is forwarded to the second switch/combiner 812, B position, the second radio sector signal is forwarded to the second 1-to-2 splitter means 832.

When the third switching means 823 is in the:

A position, the third radio sector signal is forwarded to the third switch/combiner 813, B position, the third radio sector signal is forwarded to the third 1-to-2 splitter means 833.

Figure 9:
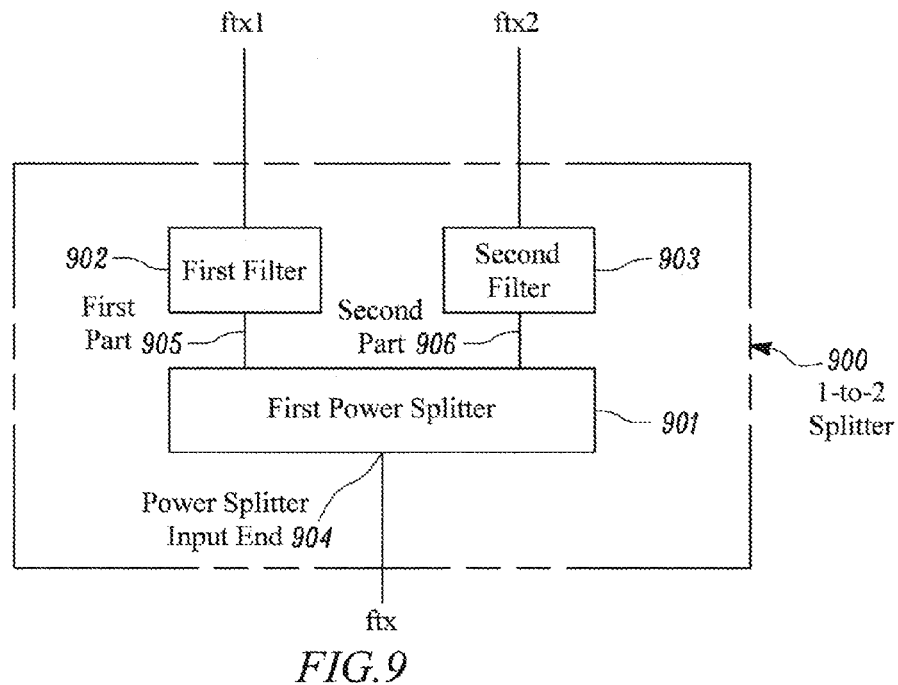
FIG. 9 schematically shows one example of a 1-to-2 splitter.
Figure 10:
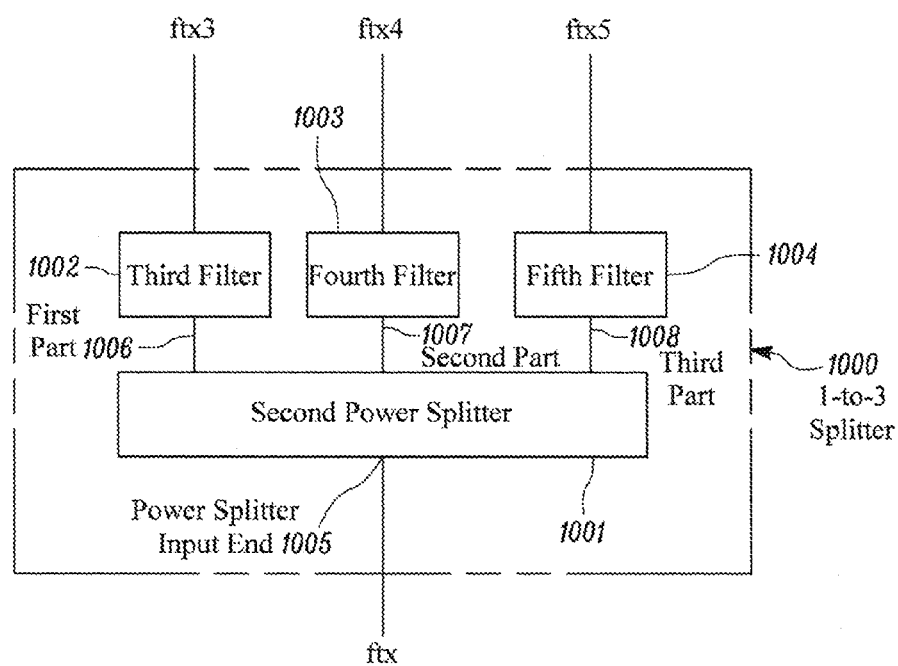
FIG. 10 schematically shows one example of a 1-to-3 splitter.

One example of the design of the three 1-to-2 splitters means 831-833 can be seen in FIG. 9 and for the 1-to-3 splitter means 834 in FIG. 10.

FIG. 8 illustrates examples of the possible splitting configurations in Tx mode for a three sector RBS with Tx-chains Tx1-Tx3. The possible paths for the first radio sector signal are illustrated with solid lines, possible paths for the second radio sector signal with dashed lines and possible paths for the third radio sector signal with dash-dotted lines.

The first sector paths are:

first sub path p11 of the first path for a first sub signal of the first radio sector signal s1 comprising the unsplit and unfiltered first radio sector signal s1 a second and third sub path of the first path, denoted p11*a* and p12, for the split and filtered radio sector signal s1, denoted second and third sub signals s11*a* and s12 of the first radio sector signal s1 and being the output from the first 1-to-2 splitter means 831 a fourth, fifth and sixth sub path of the first path, denoted p11*b*, p12*a* and p13, for the split and filtered radio sector signal s1, denoted fourth, fifth and sixth sub signals s11*b*, s12*a* and s13 of the first radio sector signal s1 and being the output from the first 1-to-3 splitter means 834.

The second sector paths are:

a first sub path p22 of the second path for a first sub signal of the second radio sector signal s2 comprising the unsplit and unfiltered second radio sector signal s2 a second and third sub path of the second path, denoted p22*a* and p23, for the split and filtered radio sector signal s2 denoted second and third sub signals s22*a* and s23 of the second radio sector signal s2 and being the output from the second 1-to-2 splitter means 832

The third sector paths are:

a first sub path p33 of the third path for a first sub signal of the third radio sector signal s3 comprising the unsplit and unfiltered third radio sector signal s3 a second and third sub path of the third path, denoted p33*a* and p31, for the split and filtered radio sector signal s3 denoted second and third sub signals s33*a* and s31 of the third radio sector signal s3, and being the output from the third 1-to-2 splitter means 833.

When the first switching means 821 is in the A position, the first radio sector signal s1 in the first sub path p11 goes to the first switch/combiner means 811 and then to the power amplifier 100.

If the first switching means 821 is in the B position the first radio sector signal s1 goes to the first 1-to-2 splitter means 831. The first 1-to-2 splitter means splits the first radio sector signal s1 into two sub signals, as described above, and filters each sub signal so that e.g. the upper half of the total transmit frequency band ftx comes in the second sub signal s11*a* of the first radio sector signal s1 in the second sub path p11*a* of the first path, and the lower half of the total transmit frequency band comes in the third sub signal s12 of the first radio sector signal s1, in the third sub path p12 of the first path. One of these two sub signals of the first radio sector signal s1 goes to sector 1 and the other sub signal of the first radio sector signal s1 to sector 2 (in the example of FIG. 8, s11a goes to sector 1 and s12 to sector 2).

If the first switching means 821 is in the C position, the first radio sector signal s1 goes to the first 1-to-3 splitter means 834. The first 1-to-3 splitter means splits the first radio sector signal into three sub signals, as described above, and filters each sub signal so that e.g. the upper third of the total transmit frequency band ftx comes in the fourth sub signal s11b of the first radio sector signal s1, in the fourth sub path p11b of the first path, and the lower third of the total transmit frequency band ftx comes in the sixth sub signal s13 of the first radio sector signal s1, in the sixth sub path p13 of the first path. The middle third of the frequency band can then in this example come in the fifth sub signal s12a of the first radio sector signal s1, in the fifth sub path p12a of the first path. One of these three sub signals of the first radio sector signal s1 goes to sector 1, one goes to sector 2 and one to sector 3.

The concept is equivalent for the second radio sector signal s2 and the third radio sector signal s3, except that these signals can only choose between the positions A and B on the second and third switching means 822 and 823. In the second Tx-chain, Tx2, the second 1-to-2 splitter means 832 splits the second path p2 into second and third sub paths of p2, denoted p22a and p23, for the split and filtered second and third sub signal of the second radio sector signal s2, denoted s22a and s23, the sub signals being the output from the second 1-to-2 splitter means 832. In the third Tx-chain, Tx3, the third 1-to-2 splitter means 833 splits the third path p3 into second and third sub paths of p3, denoted p33a and p31, for the split and filtered second and third sub signal of the third radio sector signal s3 denoted s33a and s31, the sub signals being the output from the third 1-to-2 splitter means 833.

All combinations of switching means and turn off of basebands and radios are not possible. The main combinations possible for the configuration of the first MSN according to FIG. 8 are shown in the table below.

| SW1 | SW2 | SW3 |
|---|---|---|
| A | A | A |
| A | B | turn off |
| B | turn off | A |
| turn off | A | B |
| C | turn off | turn off |

SW1-SW3 = first, second and third switching means
A-C = position of switching means
turn off = turn off of baseband and radio in the sector corresponding to the switching means In the configuration of FIG. 8 the switch/combiner means 811-813 serves to terminate the signal from the adaptive filter and splitter means and forward the sub signals to the power amplifier. The switch/combiner means can be arranged in any conventional way. Preferably a standard combiner well known to the skilled person can be used. The switch/combiner works according to the reciprocity principle, i.e. the input end of the switch/combiner in Tx-mode becomes the output end in Rx-mode and the output end in Tx-mode becomes the input end in Rx-mode. This means that the switch/combiner can also be used in Rx-mode as will be shown in FIGS. 16a and 16b.

Figure 11:
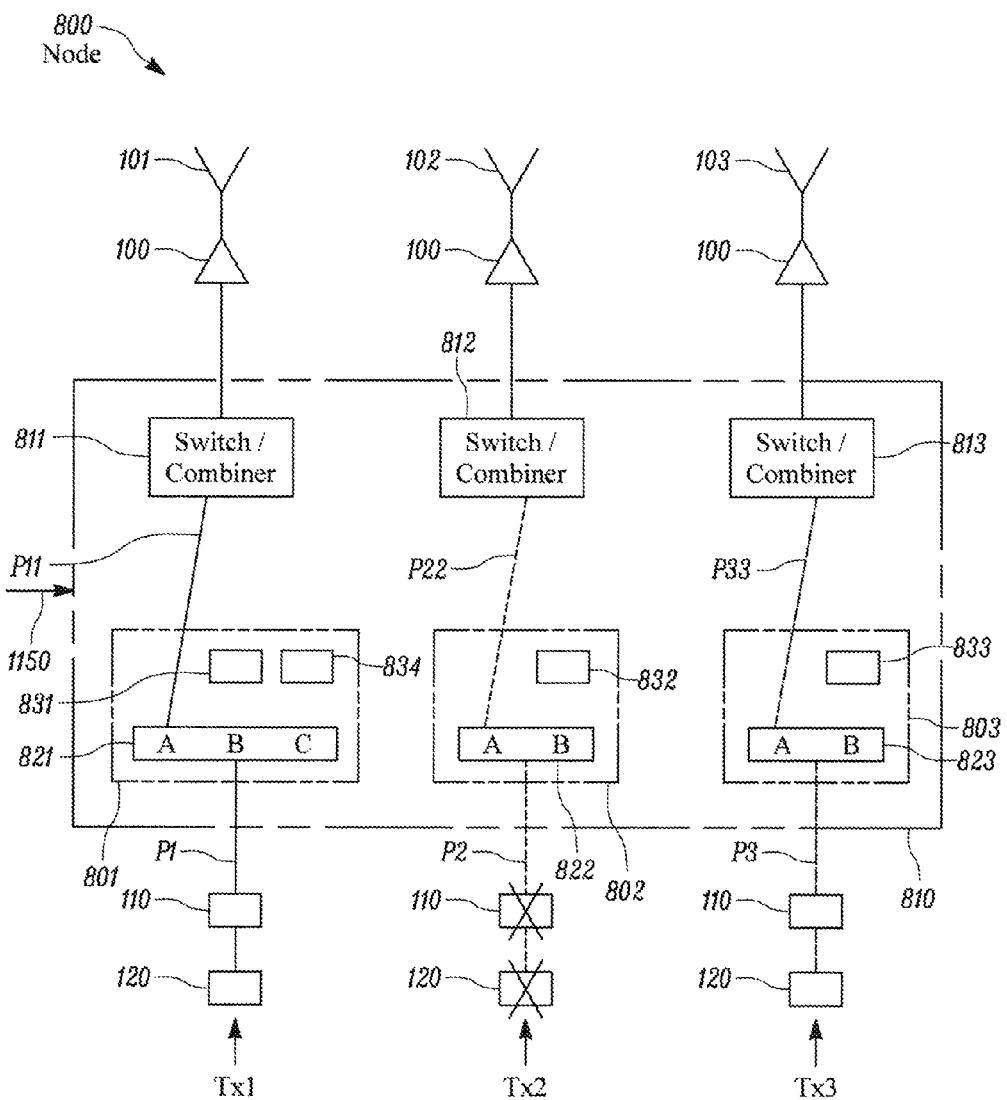
FIG. 11 schematically shows a first configuration example of the first MSN.
Figure 12:
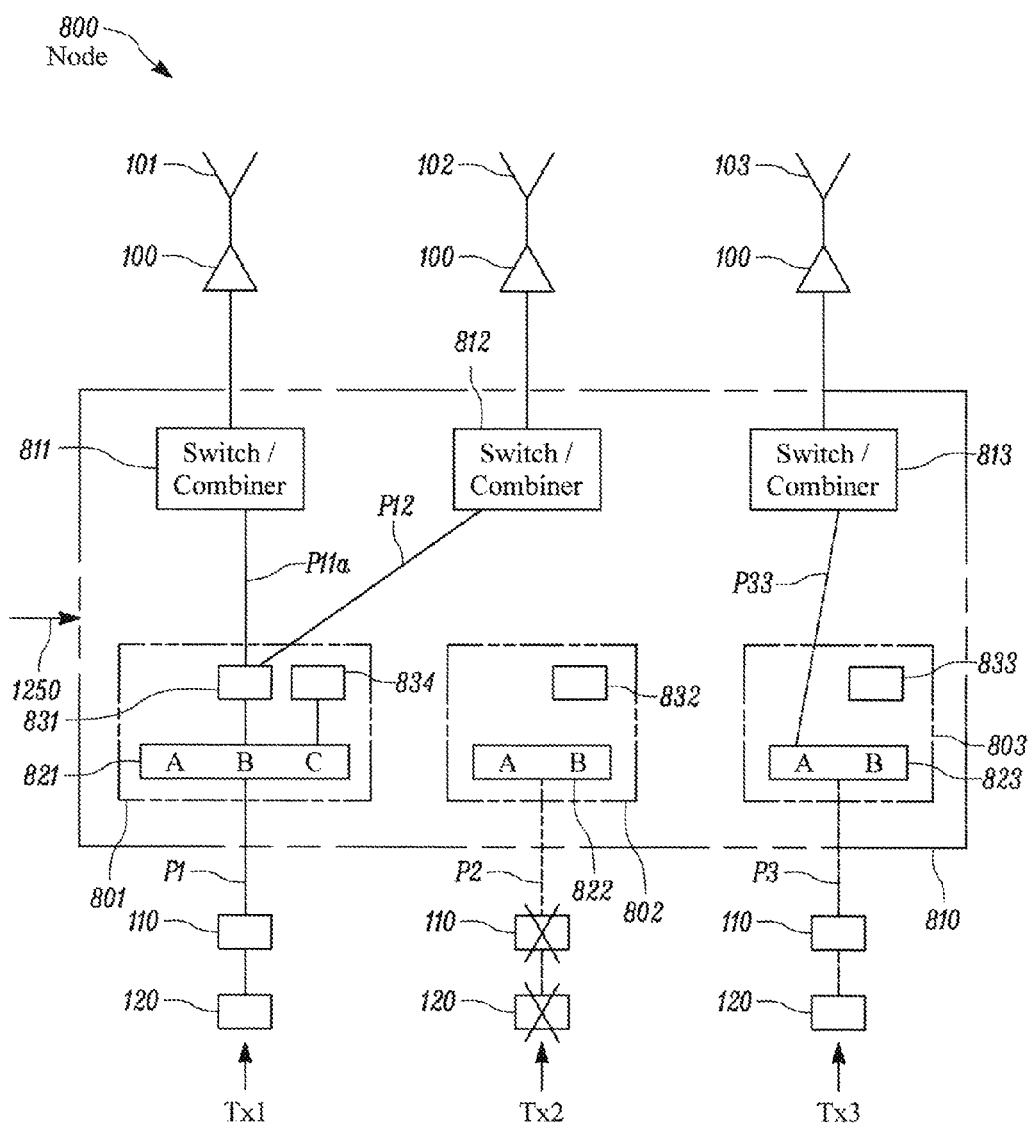
FIG. 12 schematically shows a second configuration example of the first MSN.
Figure 13:
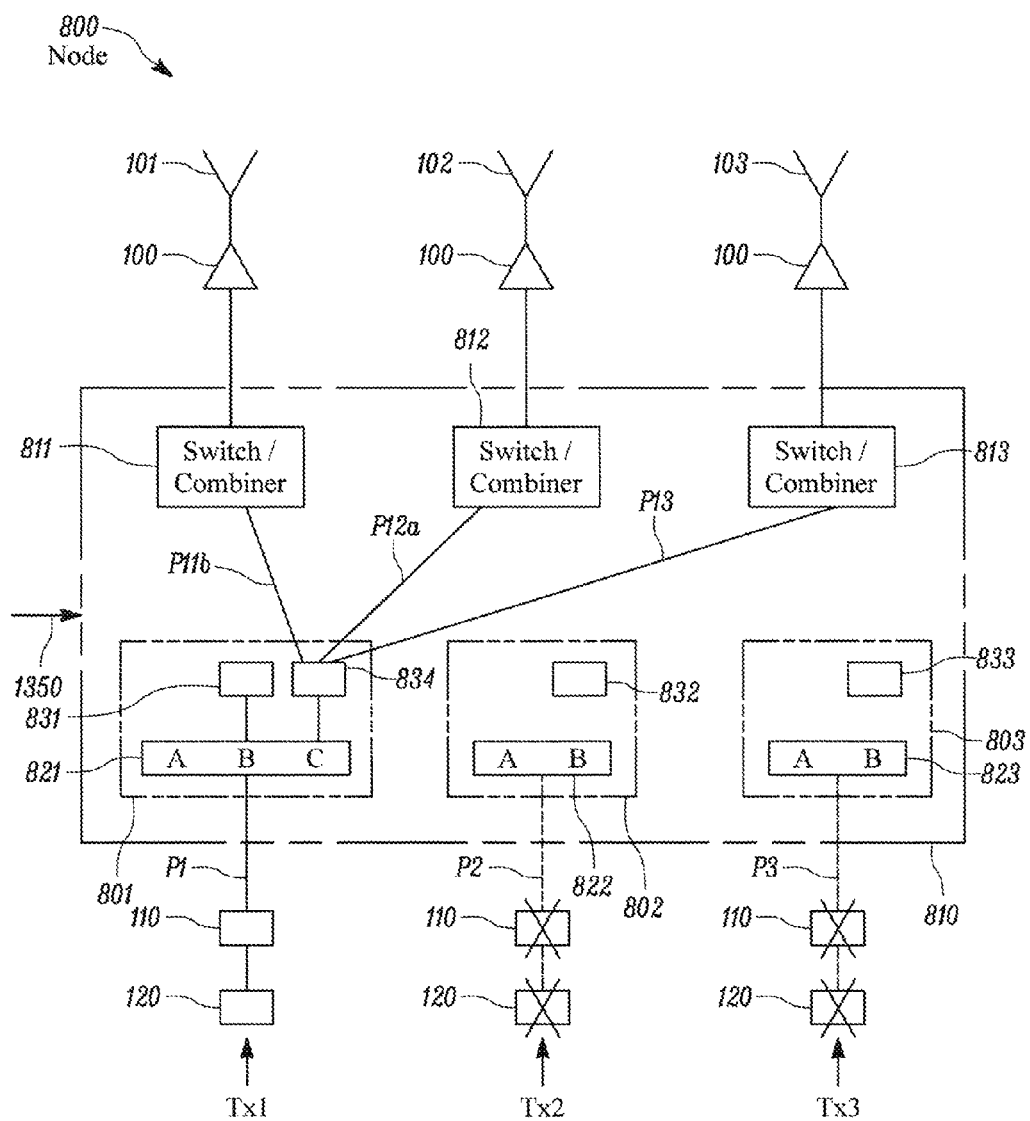
FIG. 13 schematically shows a third configuration example of the first MSN.

Three of the possible configurations in the table above will now be illustrated in FIGS. 11-13. In all examples in the description when the MSN is arranged before the power amplifiers, each power amplifier is always operating the sector antenna in its corresponding Tx-chain.

FIG. 9 shows one example of a 1-to-2 splitter 900 with a first power splitter 901 arranged to receive a radio sector signal from a Tx-chain at a power splitter input end 904. The radio sector signal operates within the total transmit frequency band ftx. The first power splitter splits the radio sector signal into a first part 905 and a second part 906. The first part is arranged to be received at an input end of a first filter 902 and the second part is arranged to be received at an input end of a second filter 903. The first filter 902 is arranged to deliver a split radio sector signal, also called a sub signal, arranged to operate within a first sub frequency band ftx1. The second filter 903 is arranged to deliver a split radio sector signal, also called a sub signal, arranged to operate within a second sub frequency band ftx2. The sub frequency bands are both within the total transmit frequency band ftx. As an example ftx can be 700-800 MHz, ftx1 700-750 MHz and ftx2 750-800 MHz.

FIG. 10 shows one example of a 1-to-3 splitter 1000 with a second power splitter 1001 arranged to receive a radio sector signal from a Tx-chain at a power splitter input end 1005. The radio sector signal operates within the total transmit frequency band ftx. The second power splitter splits the radio sector signal into a first part 1006, a second part 1007 and a third part 1008. The first part 1006 is arranged to be received at an input end of a third filter 1002, the second part 1007 is arranged to be received at an input end of a fourth filter 1003 and the third part 1008 is arranged to be received at an input end of a fifth filter 1004. The first filter 1002 is arranged to deliver a split radio sector signal, also called a sub signal, arranged to operate within a third sub frequency band ftx3. The second filter 1003 is arranged to deliver a split radio sector signal, also called a sub signal, arranged to operate within a fourth sub frequency band ftx4. The third filter 1004 is arranged to deliver a split radio sector signal, also called a sub signal, arranged to operate within a fifth sub frequency band ftx5. The sub frequency bands are both within the total transmit frequency band ftx. As an example ftx can be 700-800 MHz, ftx3 700-733 MHz, ftx4 733-766 MHz and ftx5 766-800 MHz.

The 1-to-2 splitter and the 1-to-3 splitter are also able to work according to the reciprocity principle, i.e. the input end of the splitters in Tx-mode becomes the output end in Rx-mode and the output end in Tx-mode becomes the input end in Rx-mode. This means that the splitters can also be used in Rx-mode as will be shown in FIGS. 16a and 16b. This also means that the filter function of the splitters works according to reciprocity, i.e. they are able to filter a signal entering from either end of the filter.

FIG. 11 shows a first configuration example of the first MSN according to the first example in the table above with the node 800 as described in association with FIG. 8. When all three switching means 821-823 are in the A-position the components of the first MSN 810 are arranged to be configured as follows:

the first path p1 for the first radio sector signal s1 is connected to the power amplifier of the first Tx-chain Tx1 via the first sub path p11 of the first path and the first switch/combiner means 811, the second path p2 for the second radio sector signal s2 is connected to the power amplifier for the second Tx-chain Tx2 via the first sub path p22 of the second path and the second switch/combiner means 812 and the third path p3 for the third radio sector signal s3 is connected via the first sub path p33 of the third path and the third switch/combiner means 813 to the power amplifier for the third Tx-chain, Tx3.

The configuration of FIG. 11 results in that each Tx-chain is arranged to operate within the total transmit frequency band ftx. This configuration is adapted for high traffic volumes in all three sectors.

FIG. 12 shows a second configuration example of the first MSN according to the third example in the table above. FIG. 12 shows the node 800 as described in association with FIG. 8. When the first switching means 821 is in the B-position, the Tx-baseband and Tx-radio of the second Tx-chain are arranged to be turned off and when the third switching means 823 is arranged to be in the A-position the components of the first MSN 810 are arranged to be configured as follows:

- the first path p1 for the first radio sector signal s1 is arranged to be connected to the first 1-to-2 splitter means 831 arranged to split the first path p1 with the first radio sector signal s1 into the second sub path p11a of the first path p1 with a second sub signal s11a arranged to operate in a first sub frequency band ftx1 after being arranged to be filtered in the first 1-to-2 splitter means 831 and into the third sub path p12 of the first path with a third sub signal s12 arranged to operate in a second sub frequency band ftx2 after being arranged to be filtered in the first 1-to-2 splitter means 831, both sub frequency bands arranged to operate within the total transmit frequency band ftx,
- the second sub path p11a of the first path p1 being arranged to be connected to the power amplifier of the first Tx-chain Tx1 via the first switch/combiner means 811,
- the third sub path p12 of the first path p1 being arranged to be connected to the power amplifier of the second Tx-chain Tx2 via the second switch/combiner means 812 and
- the third path p3 for the third radio sector signal s3 is arranged to be connected to the power amplifier of the third Tx-chain Tx3 via the first sub path p33 of the third path p3 and the third switch/combiner means 813.

The configuration of FIG. 12 results in the first Tx-chain being arranged to operate within the first sub frequency band ftx1, the power amplifier of the second Tx-chain within the second sub frequency band ftx2 and the third Tx-chain within the total transmit frequency band ftx. This configuration is adapted for low traffic volumes in the first and second sector and high traffic volume in the third sector. In this configuration one baseband and one radio can be turned off to reduce power consumption.

FIG. 13 shows a third configuration example of the first MSN according to the fifth example in the table above. FIG. 13 shows the node 800 as described in association with FIG. 8. When the first switching means 821 is in the C-position, the Tx-baseband and Tx-radio of the second and third Tx-chains are arranged to be turned off, the components of the first MSN 810 are arranged to be configured as follows:

- the first path p1 for the first radio sector signal s1 is arranged to be connected to the first 1-to-3 splitter means 834 arranged to split the first path p1 with the first radio sector signal s1 into the fourth sub path p11b of the first path p1 with the fourth sub signal s11b of the first radio sector signal s1 arranged to operate in a third sub frequency band ftx3 after being arranged to be filtered in the first 1-to-3 splitter means 834 and into a fifth sub path p 12a of the first path p1 with a fifth sub signal s12a of the first radio sector signal s1 arranged to operate in a fourth sub frequency band ftx4 after being arranged to be filtered in the first 1-to-3 splitter means 834 and into a sixth sub path p13 of the first path p1 with a sixth sub signal s13 of the first radio sector signal s1, arranged to operate in a fifth sub frequency band ftx5 after being arranged to be filtered in the first 1-to-3 splitter means 834, all three sub frequency bands, ftx3-ftx5, arranged to be operated within the total transmit frequency band ftx,
- the fourth sub path p11b of the first path p1 being arranged to be connected to the power amplifier of the first Tx-chain Tx1 via the first switch/combiner means 811,
- the fifth sub path p12a of the first path p1 being arranged to be connected to the power amplifier of the second Tx-chain Tx2 via the second switch/combiner means 812 and
- the sixth sub path p13 of the first path p1 being arranged to be connected to the power amplifier of the third Tx-chain Tx3 via the third switch/combiner means 813.

The configuration of FIG. 13 results in the power amplifier of first Tx-chain being arranged to operate within the third sub frequency band ftx3, the power amplifier of the second Tx-chain within the fourth sub frequency band ftx4 and the power amplifier of the third Tx-chain within a fifth sub frequency band ftx5. This configuration is adapted for low traffic volumes in all three sectors. In this configuration two basebands and two radios can be turned off to reduce power consumption.

Figure 14:
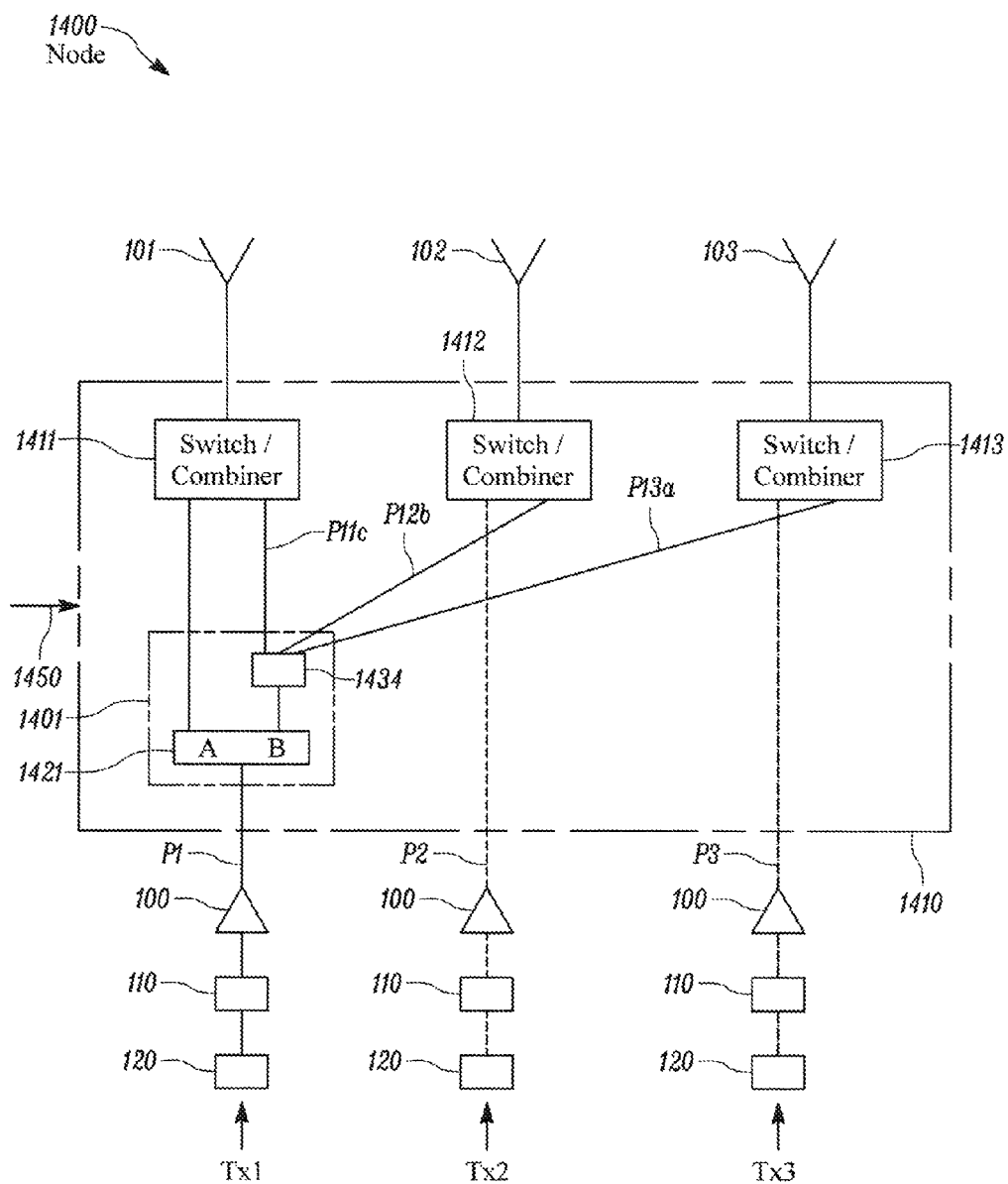
FIG. 14 schematically shows a further example of configuration possibilities for the first MSN.

FIG. 14 shows a further example of configuration possibilities for the first MSN when the first MSN is arranged after the power amplifiers. A node 1400 comprises three Rx-chains and three Tx-chains, the first Tx1, the second Tx2 and the third Tx3. The Rx-chains are not shown in FIG. 14. The Tx-chains are arranged to operate within a first, a second and a third sector with corresponding first, second and third radio sector signals s1-s3 arranged to be generated in the Tx-chains where each radio sector signal s1-s3 is arranged to operate in a total transmit frequency band ftx and being arranged to be forwarded over a first, a second and a third path, p1-p3. The first MSN 1410 is arranged across all Tx-chains after the power amplifiers, as in the basic configuration of FIG. 4, and comprises a fifth adaptive filter and splitter means, 1401, having an input end and an output end, the output end of which is connected to an input end of at least one of a fourth, a fifth and a sixth switch/combiner means 1411-1413. The output end of each switch/combiner means is connected, directly or indirectly, to a sector antenna. The adaptive filter and splitter means comprises a fourth switching means 1421 and a second 1-to-3 splitter means 1434. The splitter means comprises a splitting and filter function. The fourth switching means 1421 is arranged to receive a radio sector signal from the first Tx-chain, Tx1, the fifth switch/combiner means 1412 is arranged to receive a radio sector signal from the second Tx-chain, Tx2 and the sixth switch/combiner means 1413 is arranged to receive a radio sector signal from the third Tx-chain, Tx3. The fourth switching means and the fifth and sixth switch/combiner means are arranged to forward:

- an antenna sector signal comprising a radio sector signal from its corresponding Tx-chain, directly or indirectly, to a sector antenna of the corresponding Tx-chain, the fourth switching means forwarding the radio sector signal also via the fourth switch/combiner means (1411) or
- an antenna sector signal comprising a split radio sector signal, directly or indirectly, to each sector antenna via the second 1-to-3 splitter means (1434) and a switch/combiner means, the fourth switching means having two positions; A and B.

Figure 15:
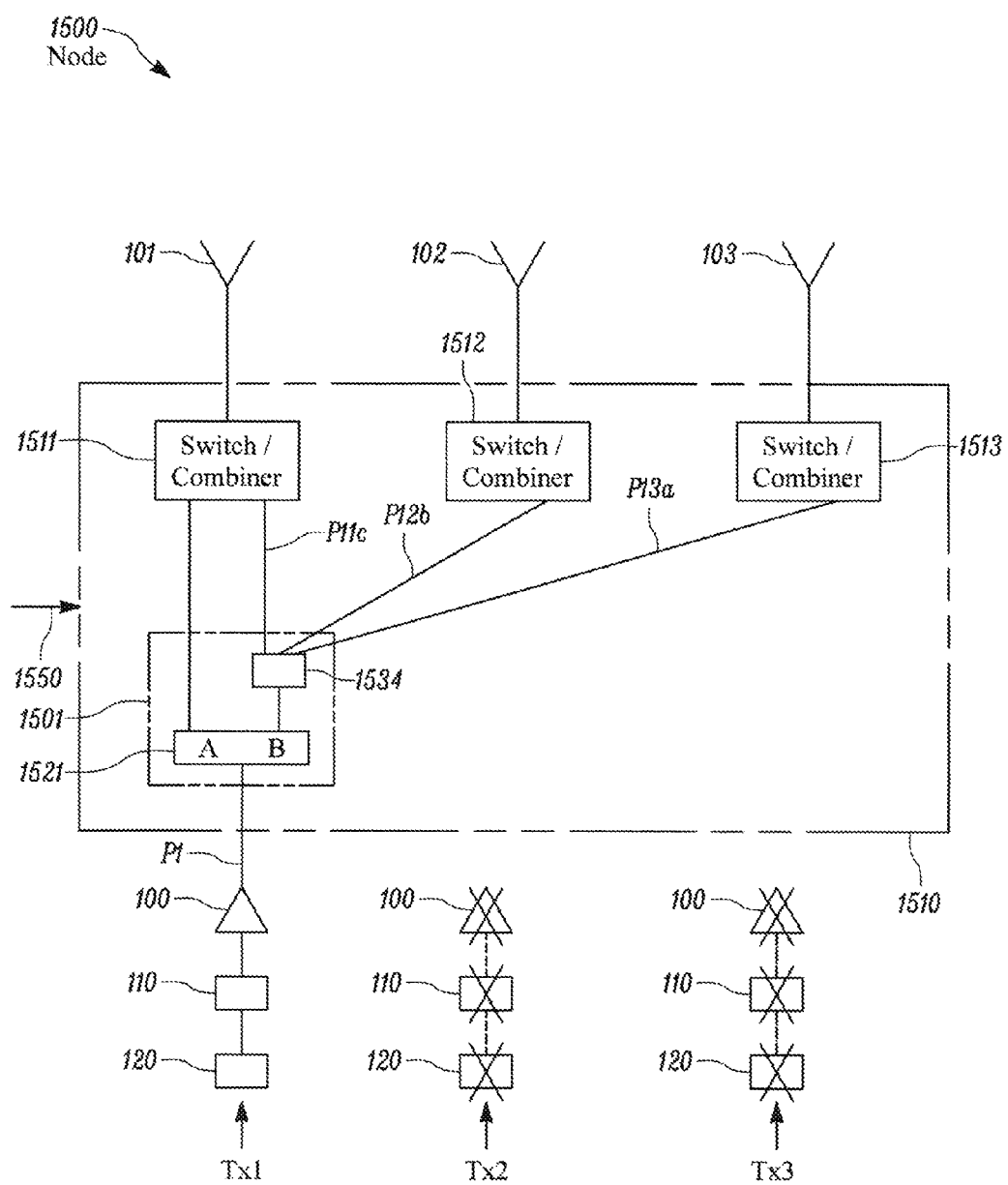
FIG. 15 schematically shows a fourth configuration example of the first MSN.

FIG. 15 shows a fourth configuration example of the first MSN in a node as described in association with FIG. 14 when the fourth switching means 1421, 1521 is in the B-position and the Tx-basebands, the Tx-radios and the power amplifiers of the second and third Tx-chain are arranged to be turned off. The components of the first MSN 1510 are then arranged to be configured as follows:

the first path p1 for the first radio sector signal s1 is arranged to be connected to the second 1-to-3 splitter means 1534 via the fourth switching means, the second 1-to-3 splitter means being arranged to split the first path p1 with the first radio sector signal s1 into a seventh sub path p11c of the first path p1 with a seventh sub signal s11c of the first radio sector signal arranged to operate in a sixth sub frequency band ftx6 after being arranged to be filtered in the second 1-to-3 splitter 1534 and into an eighth sub path p12b of the first path p1 with an eighth sub signal s12b of the first radio sector signal arranged to operate in a seventh sub frequency band ftx7 after being arranged to be filtered in the second 1-to-3 splitter means 1534 and into a ninth sub path p13a of the first radio sector signal with a ninth sub signal s13a of the first path p1 arranged to operate in an eighth sub frequency band ftx8 after being arranged to be filtered in the second 1-to-3 splitter means 1534, all three sub frequency bands, ftx6-ftx8, arranged to operate within the total transmit frequency band ftx, the seventh sub path p11c of the first path being arranged to be connected, directly or indirectly, to the first sector antenna 101 of the first Tx-chain Tx) via the fourth switch/combiner means 1511, the eighth sub path p12b of the first path being arranged to be connected, directly or indirectly, to the second sector antenna 102 of the second Tx-chain Tx2 via the fifth switch/combiner means 1512 and the ninth sub path p13a of the first path being arranged to be connected to the third sector antenna 103 of the third Tx-chain Tx3 via the sixth switching means 1513 thus resulting in the first sector antenna 101 of first Tx-chain being arranged to operate within the sixth sub frequency band ftx6, the second sector antenna 102 of the second Tx-chain within the seventh sub frequency band ftx7 and the third sector antenna 103 of the third Tx-chain within the eighth sub frequency band ftx8. This configuration is adapted for low traffic volumes in all three sectors.

When the fourth switching means 1421 is in the A position the fourth switching means is directly connected to the input end of the fourth switch/combiner means 1411 and the output end of the fourth switch/combiner is connected, directly or indirectly, to its corresponding sector antenna. The radio sector signal of the first Tx-chain Tx1 can thus be arranged to be forwarded to its corresponding sector antenna. As shown in FIG. 14, the radio sector signals of the second and third Tx-chain, Tx2 and Tx3, can be arranged to be forwarded directly to its corresponding sector antenna, directly or indirectly, via its corresponding switch/combiner means, as the power amplifiers of the second and third Tx-chains can be directly connected to the input end of the fifth switch/combiner means 1412 for Tx2 and the sixth switch/combiner means 1413 for Tx3. The output ends of the fifth and sixth switch/combiner means is then connected, directly or indirectly, to its corresponding sector antenna. In this configuration all three radio sector signals can thus be arranged to be forwarded to its corresponding sector antenna and each Tx-chain can be arranged to operate within the total transmit frequency band ftx. This configuration is adapted for high traffic volume in all three sectors.

The configuration examples shown for the first MSN in Tx-mode above can also be used for the configuration of a first or second MSN in Rx-mode.

In summary a first means for a switch and filter network function MSN 301, 401, 510, 610, 710, 810, 1410, 1510 is arranged across all Tx-chains before or after the power amplifiers 100. The first MSN comprises at least one adaptive filter and splitter means 501-503, 601-606, 801-803, 1401, 1501 having an input end and an output end, the output end of which is connected to an input end of at least one switch/combiner means 511-513, 611-613, 811-813, 1411-1413, and 1511-1513. The first MSN is arranged to receive at least one radio sector signal from at least one Tx-chain, directly or indirectly, at the input end of its corresponding adaptive filter and splitter means and to output from the output end of each of said switch/combiner means one antenna sector signal, the antenna sector signal comprising:

a radio sector signal from its corresponding Tx-chain, the radio sector signal being arranged to operate within the total transmit frequency band ftx, or a split radio sector signal from any of the Tx-chains, the split radio sector signal arranged to operate within a part of the total transmit frequency band ftx, the splitting of a radio sector signal allowing one radio sector signal to feed sector antennas in more than one sector, each sector having at least one sector antenna.

Figure 16A:
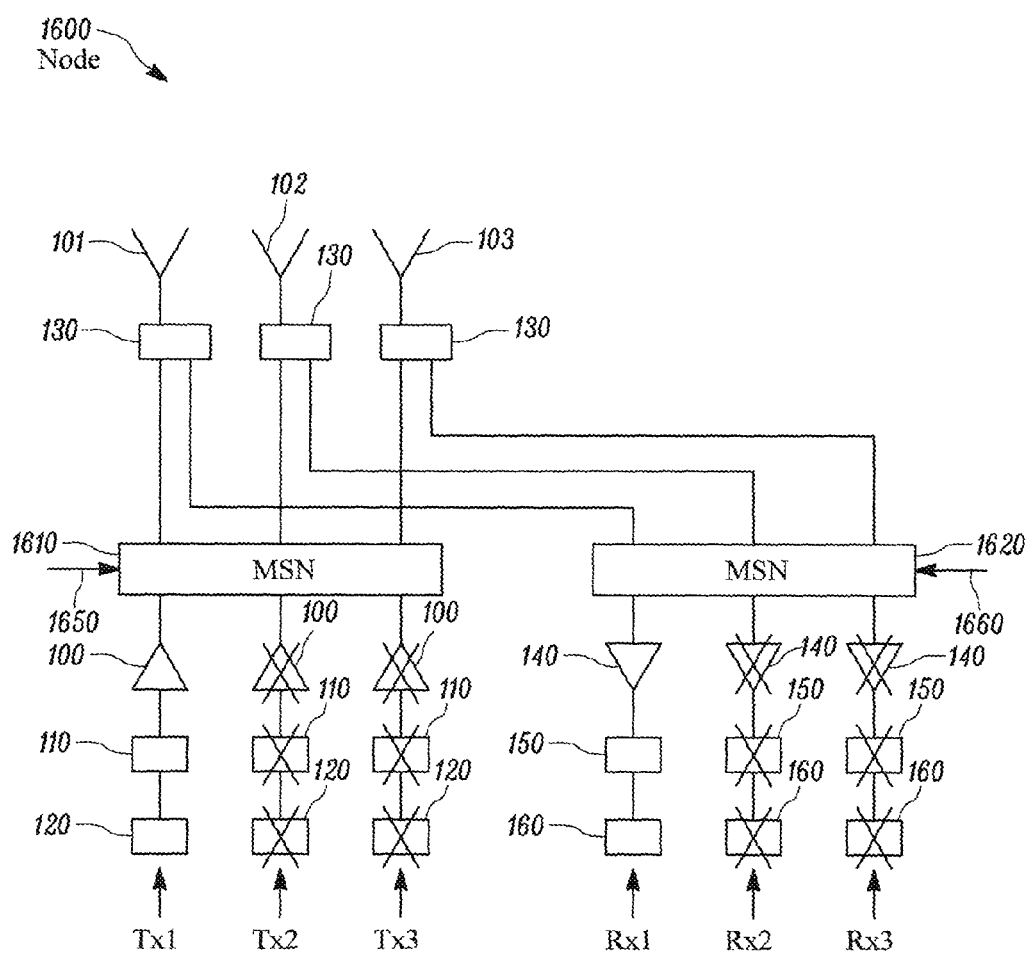
FIG. 16a schematically shows an example of the invention when implemented in an FDD system in Tx- and Rx-mode.
Figure 17:
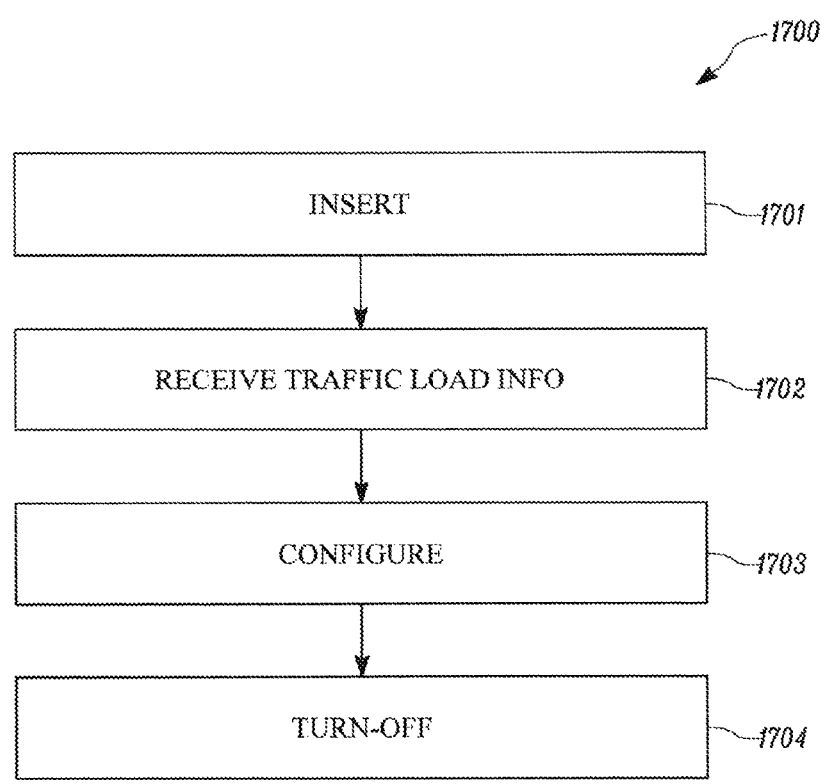
FIG. 17 shows a block diagram of one example of the method of the invention.

FIG. 16a shows an example of the invention when implemented in an FDD system in Tx- and Rx-mode with a node 1600 having the first MSN 1610 arranged across three Tx-chains Tx1-Tx3 after the power amplifiers, PA, 100 and a second MSN 1620 arranged across three Rx-chains Rx1-Rx3 before the low noise amplifiers, LNA, 140. The node further comprises three sector antennas 101-103, each covering different sectors in space. Each sector antenna is connected to a Tx/Rx-switch 130 arranged to switch the sector antenna to a Tx or Rx-chain via a first MSN 1610 in Tx-mode and via the second MSN 1620 in Rx-mode.

In the example of FIG. 16a the first MSN 1610 is configured according to the example described in FIG. 15, i.e. Tx2 and Tx3 is turned off and the radio sector signal s1 from Tx1 is split in three sub signals, each sub signal feeding a respective sector antenna. This configuration is adapted for low traffic volumes in all three sectors.

The second MSN 1620 in the example of FIG. 16a is configured exactly as the first MSN 1610 and is in the general case arranged to receive one antenna sector signal, directly or indirectly, from each sector antenna 101-103. In the example of FIG. 16a each antenna sector signal is arranged to be received indirectly via the Tx/Rx-switch at the output end of its corresponding switch/combiner means and to output from the input end of the first adaptive filter and splitter means 1501 directly to the first Rx-chain Rx1 one radio sector signal comprising three split antenna sector signals, one from each of the sector antennas, in the example of FIG. 16a each sector antenna is covering different sectors. Each split antenna sector signal is arranged to operate within a part of the total receive frequency band frx, the three signals together covering the complete frequency band frx. The splitting of the antenna sector signal thus allowing three split antenna sector signals from different sectors to be combined in the adaptive filter and splitter means 1501 into one radio sector signal. This means that the Rx-chains Rx2 and Rx3 can be turned off and the second MSN is thus adapted to low traffic volumes in all three sectors.

Figure 16B:
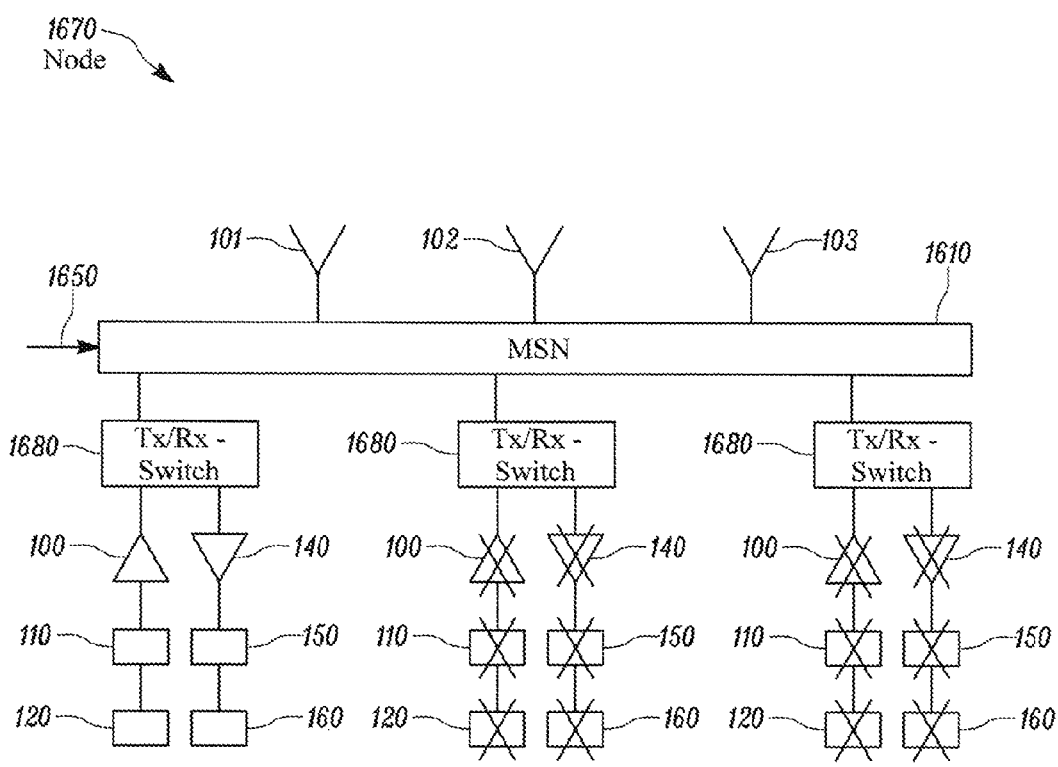
FIG. 16b schematically shows an example of the invention when implemented in a TDD system in Tx- and Rx-mode.

FIG. 16b shows an example of the invention when implemented in a TDD system in Tx- and Rx-mode with a node 1670 having the first MSN 1610 arranged across all three Tx-chains Tx1-Tx3 after the power amplifiers, PA, 100 and across all three Rx-chains Rx1-Rx3 before the low noise amplifiers, LNA, 140. The node further comprises three sector antennas 101-103, each covering different sectors in space. Each sector antenna is connected to a Tx or Rx-chain via the first MSN 1610 and a Tx/Rx-switch 1680.

In the example of FIG. 16*b* the first MSN 1610 is configured according to the example described in FIG. 15, i.e. Tx2 and Tx3 are turned off and the radio sector signal s1 from Tx1 is split in three sub signals, each sub signal feeding a respective sector antenna. This configuration is adapted for low traffic volumes in all three sectors.

The first MSN 1610 in the example of FIG. 16*b* is further arranged to receive one antenna sector signal directly from each sector antenna. Each antenna sector signal is arranged to be received at the output end of its corresponding switch/combiner means and to output from the input end of said adaptive filter and splitter means indirectly via a Tx/Rx-switch 1680, to the first Rx-chain Rx1 one radio sector signal comprising three split antenna sector signals from three sector antennas in three different sectors, each split antenna sector signal being arranged to operate within a part of the total receive frequency band frx, the three split antenna sector signals together covering the complete frequency band frx. The splitting of an antenna sector signal thus allowing three split antenna sector signals from different sectors to be combined in the adaptive filter and splitter means 1510 into one radio sector signal.

This means that the Rx-chains Rx2 and Rx3 can be turned off and the first MSN is, in the example of FIG. 16*b*, thus adapted to low traffic volumes in all three sectors for both Tx-mode and Rx-mode.

The other configurations of the MSN described for the Tx-mode can be implemented also in Rx-mode in analogy with the description above for the implementation of the MSN in Rx-mode according to the Tx-mode example of FIG. 15.

In general when the node is implemented in a FDD system the second means for a switch and filter network function MSN 1620 is arranged across all Rx-chains before or after the low noise amplifiers 140. The second MSN comprises at least one adaptive filter and splitter means 501-503, 601-606, 801-803, 1401, 1501 having an input end and an output end, the output end of which is connected to an input end of at least one switch/combiner means 511-513, 611-613, 811-813, 1411-1413, 1511-1513. The second MSN is arranged to receive one antenna sector signal directly, or indirectly via a Tx/Rx-switch, from each sector antenna. Each antenna sector signal is arranged to be received at the output end of its corresponding switch/combiner means and to output from the input end of at least one of said adaptive filter and splitter means, to its corresponding Rx-chain, one radio sector signal, each radio sector signal comprising:

an antenna sector signal from its corresponding sector antenna, the antenna sector signal being arranged to operate within the total receive frequency band frx, or at least two split antenna sector signal from different sector antennas in different sectors, each split antenna sector signal being arranged to operate within a part of the total receive frequency band frx, the splitting of an antenna sector signal allowing at least two split antenna sector signals from different sectors to be combined in the adaptive filter and splitter means 501-503, 601-606, 801-803, 1401, 1501 into one radio sector signal. This radio sector signal is preferably covering the total receive frequency band frx. The different parts of the split antenna sector signals do not necessarily have to add up to the total receive frequency band frx, the sum of the frequency parts can thus be less than frx.

In general when the node is implemented in a TDD system the first means for a switch and filter network function MSN 1610 is arranged across all Tx and Rx-chains after the power amplifiers 100 and before the low noise amplifiers 140. The first MSN 1610 is arranged to receive one antenna sector signal directly from each sector antenna. Each antenna sector signal is arranged to be received at the output end of its corresponding switch/combiner means 1511 and to output from the input end of at least one of said adaptive filter and splitter means indirectly via a Tx/Rx-switch 1680, to its corresponding Rx-chain, one radio sector signal, each radio sector signal comprising:

an antenna sector signal from its corresponding sector antenna, the antenna sector signal being arranged to operate within the total receive frequency band frx, or at least two split antenna sector signals from different sector antennas in different sectors, each split antenna sector signal being arranged to operate within a part of the total receive frequency band frx, the splitting of an antenna sector signal allowing at least two split antenna sector signals from different sectors to be combined in the adaptive filter and splitter means 501-503, 601-606, 801-803, 1401, 1501 into one radio sector signal. This radio sector signal is preferably covering the total receive frequency band frx. The different parts of the split antenna sector signals do not necessarily have to add up to the total receive frequency band frx, the sum of the frequency parts can thus be less than frx.

The definition of before or after the low noise amplifiers is made with reference to the direction of the antenna sector signal, i.e. before the low noise amplifier is between the sector antennas 101-103 and the low noise amplifiers 140 before the antenna sector signal reaches the low noise amplifier. After the low noise amplifier is defined as between the low noise amplifier and the Rx-radio 150 after the antenna sector signal has passed the low noise amplifier. When the invention is implemented in both Tx- and Rx-mode in FDD a Tx/Rx-switch is connected to the sector antenna to switch between Tx- and Rx-mode in case a Tx and Rx chain have a common sector antenna and when both Tx- and Rx-mode is implemented in TDD a Tx/Rx-switch is arranged between the MSN and the Tx/Rx-chains as shown in FIG. 16*b*.

As mentioned earlier the adaptive filter and splitter means and the switch/combiner means of the second MSN can be configured in response to traffic load, thus being able to minimize the number of radio sector signals and Rx-chains needed for forwarding information from all antenna sector signals with respect to traffic load. This can be accomplished by the traffic load information being arranged to be received at a control input 1660 to the second MSN. Through processing means in the second MSN, the second MSN is arranged to control, with the processing means and the traffic load information, the configuration of the adaptive filter and splitter means 501-503, 601-606, 801-803, 1401, 1501 and the switch/combiner means 511-513, 611-613, 811-813, 1411-1413, 1511-1513 in order to minimize the number of radio sector signals.

The traffic load information can be arranged to be supplied to the control input 1660 of the second MSN from the wireless communication system or from an external source.

The configuration of the adaptive filter and splitter means 501-503, 601-606, 801-803, 1401, 1501 and the switch/combiner means 511-513, 611-613, 811-813, 1411-1413, 1511-1513 in order to minimize the number of radio sector signals with respect to traffic load, is arranged by manual adjustments of the adaptive filter and splitter means and the switch/combiner means.

A part of, or a complete Tx and/or Rx chain, can be arranged to be turned off for each reduction of a radio sector signal by means of a control signal from the processing means of the second MSN to the Tx- or the Rx-chains or by manual means or by external control signals.

Each MSN comprises a control input. This has been illustrated in FIG. 5 with reference sign 550, in FIG. 7 with reference sign 750, in FIG. 8 with reference sign 850, in FIG. 11 with reference sign 1150, in FIGS. 12-15 with reference signs 1250-1550, in FIG. 16a with reference sign 1650 and in FIG. 16b with reference sign 1660.

FIG. 17 shows one example of the method of the invention to reduce power consumption in a node (500, 600, 800, 1400, 1500, 1600) according to any one of claims 1-18 wherein:

a first MSN (301, 401, 510, 610, 710, 810, 1410, 1510, 1610) is inserted (1701) across all Tx-chains before or after the power amplifiers (100) and/or a second MSN (1620) is inserted across all Rx-chains before or after the low noise amplifiers (140) or a first MSN is inserted (1701) across all Tx and Rx-chains after the power amplifiers (100) and before the Low Noise Amplifiers (140)

and wherein traffic load information is received (1702) at the control input (550, 750, 850, 1150, 1250, 1350, 1450, 1550, 1650, 1660) to the first and/or second MSN and, through processing means in the first and/or second MSN, or by manual means, the first and/or second MSN is configuring (1703) the adaptive filter and splitter means and the switch/combiner means in order to minimize the number of radio sector signals, thus allowing a complete, or part of a, Tx and/or Rx chain to be turned off (1704) for each reduction of a radio sector signal, needed for supplying antenna sector signals to all sector antennas and/or needed for forwarding information from all antenna sector signals with respect to traffic load, by means of a control signal from the processing means of the first and/or second MSN to the Tx- and Rx-chains or by manual means or external control signals.

The invention also provides a wireless communication system comprising a node according to any one of claims 1-18. The wireless communication system can e.g. be a GSM (Global System for Mobile communications) or LTE (Long Term Evolution) system.

The invention is not limited to the embodiments and examples described above, but may vary freely within the scope of the appended claims.

The invention claimed is:

1. A node for use in a wireless communication system comprising:

at least two Transmit chains (Tx-chains) and at least two Receive chains (Rx-chains), each Tx-chain and each Rx-chain comprising an antenna end and a radio end, the antenna end connected to a sector antenna, each sector antenna configured to operate within a certain sector in space, wherein the at least two Tx-chains comprises:

a first Tx-chain Tx1 configured to work within a first sector and generate a corresponding first radio sector signal s1;

a second Tx-chain Tx2 configured to work within a second sector and generate a corresponding second radio sector signal s2;

a third Tx-chain Tx3 configured to work within a third sector and generate a corresponding third radio sector signal s3; and wherein each of s1, s2, and s3 are configured to operate in the total transmit frequency band ftx and to be forwarded over a first, a second and a third path;

each Tx-chain comprising Tx-baseband processing circuitry, a Tx-radio, and a power amplifier connected in series, with the power amplifier connected to one sector antenna;

each Tx-chain configured to operate within a total transmit frequency band ftx;

each Rx-chain comprising Rx-baseband processing circuitry, an Rx-radio, and a low noise amplifier connected in series, with the low noise amplifier connected to one sector antenna;

each Rx-chain being arranged to operate within a total receive frequency band frx;

a first switch and filter network function (MSN) arranged across all Tx-chains, the first MSN comprising:

at least one adaptive filter-splitter having an input end and an output end, at least one switch-combiner having an input end and an output end; and the output end of the at least one adaptive filter-splitter connected to the input end of the at least one switch-combiner; and the first MSN configured to:

receive at least one radio sector signal from at least one Tx-chain of the at least two Tx-chains at the input end of a corresponding adaptive filter-splitter of the at least one adaptive filter-splitter; and output one antenna sector signal from the output end of each switch-combiner, the one antenna sector signal comprising either:

the at least one radio sector signal from the corresponding Tx-chain of the at least two Tx-chains, the radio sector signal configured to operate within the total transmit frequency band ftx, wherein the one antenna sector signal is output from the output end of each switch-combiner to a corresponding power amplifier; or a split radio sector signal of the at least one radio sector signal from any of the at least two Tx-chains, the split radio sector signal configured to operate within a portion of the total transmit frequency band ftx, the split radio sector signal allowing one radio sector signal to feed sector antennas in more than one sector, each sector having at least one sector antenna;

wherein the first MSN is arranged across all Tx-chains before the power amplifiers and comprises a first, second, third adaptive filter-splitters, each having an input end and an output end, the output end of which is connected to an input end of at least one of a first, second, and third switch-combiner;

wherein the output end of each switch-combiner is connected via the power amplifier to a sector antenna;

wherein the adaptive filter-splitters comprise first, second, and third switches and first, second, and third 1-to-2 splitters, respectively;

wherein the first adaptive filter-splitter further comprises a first 1-to-3 splitter; each splitter comprising a splitting and filter function;

wherein the first switch receives the first radio sector signal from the first Tx-chain;

wherein the second switch receives the second radio sector signal from the second Tx-chain;

wherein the third switch receives the third radio sector signal from the third Tx-chain, wherein each switch is configured to forward either:

an antenna sector signal comprising a radio sector signal in the corresponding Tx-chain to a sector antenna via a switch-combiner and a power amplifier; or an antenna sector signal comprising a radio sector signal split at the corresponding 1-to-2 splitter or at the first 1-to-3 splitter, the split radio sector signals being forwarded in at least two Tx-chains to a sector antenna via a switch-combiner and a power amplifier; and wherein the first switch has three positions: A, B, and C;

wherein the second and third switches have two positions: A and B;

wherein, when the first switch is in the B-position, the Tx-baseband and Tx-radio of the second Tx-chain Tx2 are turned off, and the third switch is in the A-position, the components of the first MSN configured for low traffic volumes in the first and second sector and high traffic volume in the third sector as follows:

the first path for the first radio sector signal s1 is connected to the first 1-to-2 splitter, the first 1-to-2 splitter configured to split the first path with the first radio sector signal s1 into:

a second subpath of the first path with a second subsignal s11a, the second subsignal s11a configured to operate in a first sub frequency band ftx1 after being filtered in the first 1-to-2 splitter; and a third subpath of the first path with a third subsignal s12, the third subsignal s12 configured to operate in a second sub frequency band ftx2 after being filtered in the first 1-to-2 splitter;

wherein both sub frequency bands ftx1 and ftx2 are within the total transmit frequency band ftx;

wherein the second subpath of the first path connects to the power amplifier of the first Tx-chain Tx1 via the first switch-combiner;

wherein the third subpath of the first path connects to the power amplifier of the second Tx-chain Tx2 via the second switch-combiner;

wherein the third path for the third radio sector signal s3 connects to the power amplifier of the third Tx-chain Tx3 via a first subpath of the third path and the third switch-combiner;

wherein the first Tx-chain is configured to operate within the first sub frequency band ftx1;

wherein the power amplifier of the second Tx-chain operates within the second sub frequency band ftx2; and wherein the third Tx-chain Tx3 operates within the total transmit frequency band ftx.

2. The node of claim 1, wherein the at least one adaptive filter-splitter and the at least one switch-combiner of the first MSN are configured in response to a traffic load to minimize a number of radio sector signals needed for supplying antenna sector signals to all sector antennas with respect to the traffic load.

3. The node of claim 2 wherein the first MSN is configured to:

receive the traffic load at a control input; and control, based on the traffic load, configuration of the at least one adaptive filter-splitter and the at least one switch-combiner in order to minimize the number of radio sector signals.

4. The node of claim 3, wherein the first MSN is configured to receive the traffic load from the wireless communication system.

5. The node of claim 1, further comprising:

a second MSN arranged across all Rx-chains, the second MSN comprising:

at least one second adaptive filter-splitter having an input end and an output end;

at least one second switch-combiner having an input end and an output end; and the output end of the at least one second adaptive filter-splitter connected to the input end of the at least one second switch-combiner; and the second MSN configured to:

receive one antenna sector signal from each sector antenna, each antenna sector signal received at the output end of a corresponding second switch-combiner of the at least one second switch-combiner; and output one radio sector signal from an input end of at least one of the at least one second adaptive filter-splitter to a corresponding Rx-chain of the at least two Rx-chains, each radio sector signal comprising either:

an antenna sector signal from a corresponding sector antenna, the antenna sector signal being configured to operate within the total receive frequency band frx; or at least two split antenna sector signals from different sector antennas in different sectors, each split antenna sector signal being configured to operate within a part of the total receive frequency band frx, the split antenna sector signal allowing at least two split antenna sector signals from different sectors to be combined in a corresponding adaptive filter-splitter of the at least one second adaptive filter-splitter into one radio sector signal.

6. The node of claim 5, wherein the at least one second adaptive filter-splitter and the at least one second switch-combiner of the second MSN are configured in response to a traffic load to minimize a number of radio sector signals and Rx-chains needed for forwarding information from all antenna sector signals with respect to the traffic load.

7. The node of claim 1:

wherein the first MSN is configured to:

receive one antenna sector signal directly from each sector antenna, each antenna sector signal received at the output end of a corresponding switch-combiner of the at least one switch-combiner; and output one radio sector signal from the input end of at least one of the at least one adaptive filter-splitter to a corresponding Rx-chain indirectly via a Tx-Rx-switch, each radio sector signal comprising either:

an antenna sector signal from a corresponding sector antenna, the antenna sector signal configured to operate within the total receive frequency band frx; or at least two split antenna sector signals from different sector antennas in different sectors, each split antenna sector signal being arranged to operate within a part of the total receive frequency band frx, the split antenna sector signal allowing at least two split antenna sector signals from different sectors to be combined in a corresponding adaptive filter-splitter of the at least one adaptive filter-splitter into one radio sector signal.

8. The node of claim 1, wherein connections between the at least two Tx-chains, the at least two Rx-chains, and corresponding sector antennas are indirect via a Tx-Rx-switch.

9. The node of claim 1, wherein the at least one adaptive filter-splitter and the at least one switch-combiner are configured to be manually adjusted in order to minimize a number of radio sector signals with respect to a traffic load.

10. The node of claim 1, wherein the at least two Tx-chains and the at least two Rx-chains are configured to be turned off in whole or in part based on a control signal from the first MSN.

11. The node of claim 1, wherein, when N denotes the total number of sectors antennas for all sectors and M denotes either a) the total number of Tx-chains or the total number of Rx-chains in Frequency Division Duplexing applications or b) the total number of Tx/Rx-chains in a Time Division Duplexing application:

there are M adaptive filter-splitters and N switch-combiners, where M >N;

a number of outputs at the output end of the adaptive filter-splitters is equal to N: and a number of inputs at the input end of the switch-combiners is equal to M such that each adaptive filter-splitter may be connected to each switch-combiner.

12. The node of claim 1, wherein, when all three switches are in the A position, the components of the first MSN are configured for high traffic volumes in all three sectors as follows:

a first path for the first radio sector signal s1 is connected to the power amplifier of the first Tx-chain Tx1 via a first subpath of the first path and the first switch-combiner;

the second path for the second radio sector signal s2 is connected to the power amplifier for the second Tx-chain Tx2 via a first subpath of the second path and the second switch-combiner;

the third path for the third radio sector signal s3 is connected via a first subpath of the third path and the third switch-combiner to the power amplifier for the third Tx-chain Tx3: and wherein each Tx-chain is configured to operate within the total transmit frequency band ftx.

13. The node of claim 1, wherein, when the first switch is in the C- position, the Tx-baseband and Tx-radio of both the second and third Tx-chains are turned off, the components of the first MSN are configured for low traffic volumes in all three sectors as follows:

the first path for the first radio sector signal s1 is connected to the first 1-to-3 splitter, the first 1-to-3 splitter configured to split the first path with the first radio sector signal s1 into:

a fourth subpath of the first path with a fourth subsignal s11b of the first radio sector signal s1, the fourth subsignal s11b configured to operate in a third sub frequency band ftx3 after being filtered in the first 1-to-3 splitter;

a fifth subpath of the first path with a fifth subsignal s12a of the first radio sector signal s1, the fifth subsignal s12a configured to operate in a fourth sub frequency band ftx4 after being filtered in the first 1-to-3 splitter; and a sixth subpath of the first path with a sixth subsignal s13 of the first radio sector signal s1, the sixth subsignal s13 configured to operate in a fifth sub frequency band ftx5 after being filtered in the first 1-to-3 splitter;

wherein all three sub frequency bands ftx3-ftx5 are within the total transmit frequency band ftx;

wherein the fourth subpath of the first path connects to the power amplifier of the first Tx-chain Tx1 via the first switch-combiner;

wherein the fifth subpath of the first path connects to the power amplifier of the second Tx-chain Tx2 via the second switch-combiner;

wherein the sixth subpath of the first path being connects to the power amplifier of the third Tx-chain Tx3 via the third switch-combiner;

wherein the power amplifier of first Tx-chain operates within the third sub frequency band ftx3;

wherein the power amplifier of the second Tx-chain operates within the fourth sub frequency band ftx4; and wherein the power amplifier of the third Tx-chain operates within the fifth sub frequency band ftx5.

14. The node of claim 1:

wherein the at least two Tx-chains comprises:

first Tx-chain Tx1 configured to work within a first sector and generate a corresponding first radio sector signal s1;

second Tx-chain Tx2 configured to work within a second sector generate a corresponding second radio sector signal s2;

third Tx-chain Tx3 configured to work within a third sector generate a corresponding third radio sector signal s3; and wherein each of s1, s2, and s3 are configured to operate in the total transmit frequency band ftx and to be forwarded over a first, a second and a third path;

wherein the first MSN is arranged across all Tx-chains after the power amplifiers and comprises a fifth adaptive filter-splitter, the fifth adaptive filter-splitter having an output end connected to an input end of at least one of a fourth, a fifth, and a sixth switch-combiner;

the output end of each switch-combiner being connected to a sector antenna;

wherein the fifth adaptive filter-splitter comprises a fourth switch and a second 1-to-3 splitter, the second 1-to-3 splitter comprising a splitting and filter function;

wherein the fourth switch is arranged to receive a radio sector signal from the first Tx-chain;

wherein the fifth switch-combiner is arranged to receive a radio sector signal from the second Tx-chain;

wherein the sixth switch-combiner is arranged to receive a radio sector signal from the third Tx-chain;

wherein the fourth switch and the fifth and sixth switch-combiners are configured to forward either:

an antenna sector signal comprising a radio sector signal from a corresponding Tx-chain to a sector antenna of the corresponding Tx-chain, with the fourth switch forwarding the radio sector signal via the fourth switch-combiner; or an antenna sector signal comprising a split radio sector signal to each sector antenna via the second 1-to-3 splitter and a switch-combiner; and wherein the fourth switch having two positions: A and B.

15. The node of claim 14, wherein, when the fourth switch is in the 13-position, the Tx-baseband, the Tx-radios, and the power amplifiers of the second and third Tx-chains are turned off, the components of the first MSN are configured for low traffic volumes in all three sectors as follows:

a first path for the first radio sector signal s1 connects to the second 1-to-3 splitter via the fourth switch;

the second 1-to-3 splitter splits the first path of the first radio sector signal s1 into:

a seventh subpath of the first path with a seventh subsignal s11c of the first radio sector signal, the seventh subsignal s11c operating in a sixth sub frequency band ftx6 after being filtered in the second 1-to-3 splitter;

an eighth subpath of the first path with an eighth subsignal s12b of the first radio sector signal, the eighth subsignal s12b operating in a seventh sub frequency band ftx7 after being filtered in the second 1-to-3 splitter; and a ninth subpath of the first path with a ninth subsignal s13a of the first radio sector signal, the ninth signal s13a operating in an eighth sub frequency band ftx8 after being filtered in the second 1-to-3 splitter;

wherein all three sub frequency bands ftx6-ftx8 operate within the total transmit frequency band ftx1;
wherein the seventh subpath connects to a first sector antenna of the first Tx-chain via the fourth switch-combiner;
wherein the eighth subpath connects to a second sector antenna of the second Tx-chain via the fifth switch-combiner;
wherein the ninth subpath connects to a third sector antenna of the third Tx-chain via the sixth switch-combiner;
wherein the first sector antenna of first Tx-chain operates within the sixth sub frequency band ftx6;
wherein the second sector antenna of the second Tx-chain operates within the seventh sub frequency band ftx7; and
wherein the third sector antenna of the third Tx-chain operates within the eighth sub frequency band ftx8.

16. The node of claim 1:
wherein the Tx-radio and the power amplifier for at least one Tx-chain is divided in at least two carrier parts, each carrier part operating within a part of the total transmit frequency band ftx, each carrier part arranged to forward a divided radio sector signal within the frequency range of the carrier part to one adaptive filter-splitter, and wherein the one adaptive filter-splitter is configured to forward either:
  an unsplit divided radio sector signal to corresponding switch-combiners, where the divided radio sector signal are arranged to be combined into one antenna sector signal comprising all carrier parts, the antenna sector signal being arranged for operation within the total transmit frequency band ftx; or
  at least two split divided radio sector signals, each split divided radio sector signal arranged to be forwarded to different switch-combiners where the split divided radio sector signals from different carrier parts are combined into one split antenna sector signal comprising all carrier parts, the split antenna sector signal configured to operate within a part of the total transmit frequency band ftx.

17. A method to reduce power consumption in a node in a wireless communication system, configuring the node to comprise:
at least two Transmit chains (Tx-chains) and at least two Receive chains (Rx-chains), each Tx-chain and each Rx-chain comprising an antenna end and a radio end, the antenna end connected to a sector antenna, each sector antenna configured to operate within a certain sector in space, configuring the at least two Tx-chains to comprise:
  a first Tx-chain Tx1 configured to work within a first sector and generate a corresponding first radio sector signal s1;
  a second Tx-chain Tx2 configured to work within a second sector generate a corresponding second radio sector signal s2;
  a third Tx-chain Tx3 configured to work within a third sector generate a corresponding third radio sector signal s3; and
  wherein each of s1, s2, and s3 are configured to operate in the total transmit frequency band ftx and to be forwarded over a first, a second and a third path;
  each Tx-chain comprising Tx-baseband processing circuitry, a Tx-radio, and a power amplifier connected in series, with the power amplifier connected to one sector antenna;
  each Tx-chain configured to operate within a total transmit frequency band ftx;
  each Rx-chain comprising Rx-baseband processing circuitry, an Rx-radio, and a low noise amplifier connected in series, with the low noise amplifier connected to one sector antenna; each Rx-chain being arranged to operate within a total receive frequency band frx; and
  a first switch and filter network function (MSN) arranged across all Tx-chains, the first MSN comprising:
    at least one adaptive filter-splitter having an input end and an output end;
    at least one switch-combiner having an input end and an output end: and
    the output end of at least one adaptive filter-splitter connected to the input end of the at least one switch-combiner;
wherein the method further comprises:
receiving, by the first MSN, at least one radio sector signal from at least one Tx-chain of the at least two Tx-chains at the input end of a corresponding adaptive filter-splitter of the at least one adaptive filter-splitter;
outputting, by the first MSN, one antenna sector signal from the output end of each adaptive switch-combiner of the at least one adaptive switch-combiner, the one antenna sector signal comprising either:
  at least one radio sector signal from a corresponding Tx-chain of the at least two Tx-chains, the at least one radio sector signal configured to operate within the total transmit frequency band ftx, wherein the one antenna sector signal is output from the output end of each switch-combiner to a corresponding power amplifier; or
  a split radio sector signal of the at least one radio sector signal from any of the at least two Tx-chains, the split radio sector signal configured to operate within a part of the total transmit frequency band ftx, the split radio sector signal allowing one radio sector signal to feed sector antennas in more than one sector, each sector having at least one sector antenna; and
receiving, by the first MSN, a traffic load: and
  configuring, by the first MSN, the at least one adaptive filter-splitter and the at least one switch-combiner to minimize a number of radio sector signals needed for supplying antenna sector signals to all sector antennas so as to allow at least one of the at least two Tx-chains to be turned off;
wherein the first MSN is arranged across all Tx-chains before the power amplifiers and comprises a first, second, third adaptive filter-splitters, each having an input end and an output end, the output end of which is connected to an input end of at least one of a first, second, and third switch-combiner;
wherein the output end of each switch-combiner is connected via the power amplifier to a sector antenna;
wherein the adaptive filter-splitters comprise first, second, and third switches and first, second, and third 1-to-2 splitters, respectively;
wherein the first adaptive filter-splitter further comprises a first 1-to-3 splitter; each splitter comprising a splitting and filter function;
wherein the first switch receives the first radio sector signal from the first Tx-chain;
wherein the second switch receives the second radio sector signal from the second Tx-chain;

wherein the third switch receives the third radio sector signal from the third Tx-chain, wherein each switch is configured to forward either:
- an antenna sector signal comprising a radio sector signal in the corresponding Tx-chain to a sector antenna via a switch-combiner and a power amplifier: or
- an antenna sector signal comprising a radio sector signal split at the corresponding 1-to-2 splitter or at the first 1-to-3 splitter, the split radio sector signals being forwarded in at least two Tx-chains to a sector antenna via a switch-combiner and a power amplifier; and wherein the first switch has three positions: A, B, and C;

wherein the second and third switches have two positions: A and B;

wherein, when the first switch is in the B-position, the Tx-baseband and Tx-radio of the second Tx-chain Tx2 are turned off, and the third switch is in the A-position, the components of the first MSN configured for low traffic volumes in the first and second sector and high traffic volume in the third sector as follows:

the first path for the first radio sector signal s1 is connected to the first 1-to-2 splitter, the first 1-to-2 splitter configured to split the first path with the first radio sector signal s1 into:
- a second subpath of the first path with a second subsignal s11a, the second subsignal s11a configured to operate in a first sub frequency band ftx1 after being filtered in the first 1-to-2 splitter; and
- a third subpath of the first path with a third subsignal s12, the third subsignal s12 configured to operate in a second sub frequency band ftx2 after being filtered in the first 1-to-2 splitter;

wherein both sub frequency bands ftx1 and ftx2 are within the total transmit frequency band ftx;

wherein the second subpath of the first path connects to the power amplifier of the first Tx-chain Tx1 via the first switch-combiner;

wherein the third subpath of the first path connects to the power amplifier of the second Tx-chain Tx2 via the second switch-combiner;

wherein the third path for the third radio sector signal s3 connects to the power amplifier of the third Tx-chain Tx3 via a first subpath of the third path and the third switch-combiner;

wherein the first Tx-chain is configured to operate within the first sub frequency band ftx1;

wherein the power amplifier of the second Tx-chain operates within the second sub frequency band ftx2; and wherein the third Tx-chain Tx3 operates within the total transmit frequency band ftx.

* * * * *